United States Patent
Misaki et al.

(10) Patent No.: US 7,298,436 B2
(45) Date of Patent: Nov. 20, 2007

(54) LIQUID CRYSTAL DISPLAY SUBSTRATE, METHOD OF MANUFACTURING THE SAME, AND LIQUID CRYSTAL DISPLAY DEVICE HAVING THE SAME

(75) Inventors: Katsunori Misaki, Kawasaki (JP); Yoshinori Tanaka, Kawasaki (JP); Seiji Doi, Kawasaki (JP)

(73) Assignees: Fujitsu Limited, Kawasaki (JP); AU Optronics Corporation (TW)

( * ) Notice: Subject to any disclaimer, the term of this patent is extended or adjusted under 35 U.S.C. 154(b) by 243 days.

(21) Appl. No.: 10/941,520

(22) Filed: Sep. 15, 2004

(65) Prior Publication Data

US 2005/0219444 A1  Oct. 6, 2005

(30) Foreign Application Priority Data

Mar. 31, 2004  (JP) .............................. 2004-106150

(51) Int. Cl.
*G02F 1/1333* (2006.01)
(52) U.S. Cl. ........................................ 349/110; 349/114
(58) Field of Classification Search ................ 349/110, 349/111, 113, 114
See application file for complete search history.

(56) References Cited

U.S. PATENT DOCUMENTS

| | | | |
|---|---|---|---|
| 5,724,111 | A | 3/1998 | Mizobata et al. |
| 6,281,952 | B1 * | 8/2001 | Okamoto et al. ............. 349/12 |
| 6,295,109 | B1 | 9/2001 | Kubo et al. |
| 6,757,038 | B2 | 6/2004 | Kumagai et al. |
| 6,985,195 | B1 | 1/2006 | Kumagai et al. |
| 2002/0140886 | A1 | 10/2002 | Sugiura et al. |

FOREIGN PATENT DOCUMENTS

| | | |
|---|---|---|
| JP | 5-232455 | 9/1993 |
| JP | 8-338993 | 12/1996 |
| JP | 2002-221716 | 8/2002 |
| JP | 2002-296585 | 10/2002 |
| KR | 2000-0058153 | 9/2000 |
| KR | 10-0283275 | 3/2001 |
| KR | 10-2004-0024378 | 3/2004 |
| KR | 10-2004-0025846 | 3/2004 |

\* cited by examiner

*Primary Examiner*—Mike Qi
*Assistant Examiner*—David Y. Chung
(74) *Attorney, Agent, or Firm*—Greer, Burns & Crain, Ltd.

(57) ABSTRACT

A liquid crystal display substrate capable of providing good reflection display characteristics, a method of manufacturing the same, and a liquid crystal display device having the same are provided. The liquid crystal display substrate contains a plurality of pixel areas each having a reflection area reflecting light incident from a front surface side of the substrate and a transmission area transmitting light incident from a back surface side of the substrate; a wrinkled resin layer formed with a positive light-sensitive resin in the reflection area and having at least a portion thereof a wrinkled surface; a reflection electrode formed with a light reflection material on the wrinkled resin layer and having a wrinkled surface following the surface of the wrinkled resin layer; and light shielding portions formed as an underlayer of the wrinkled resin layer and shielding light incident from the back surface of the substrate.

3 Claims, 26 Drawing Sheets

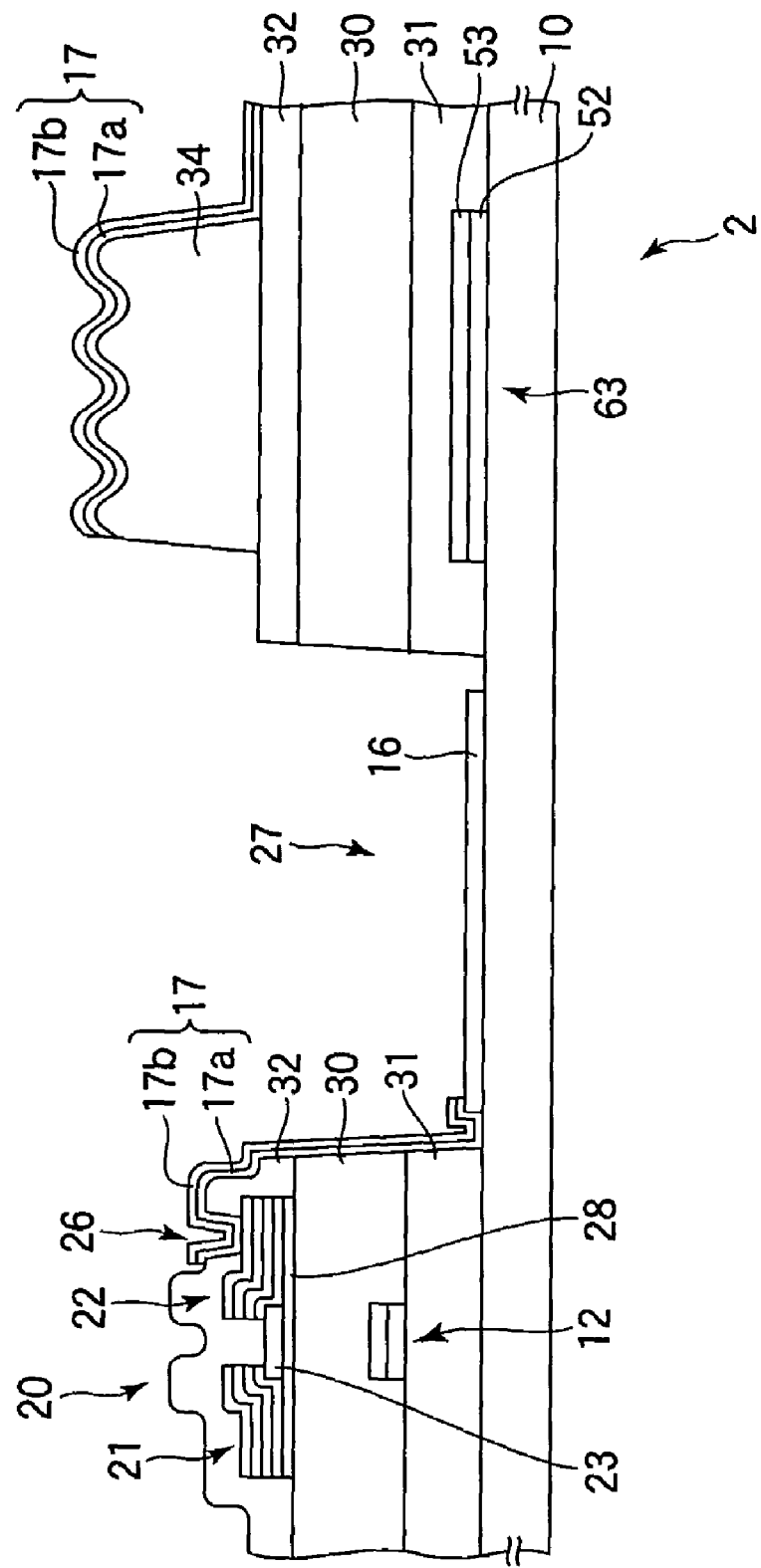

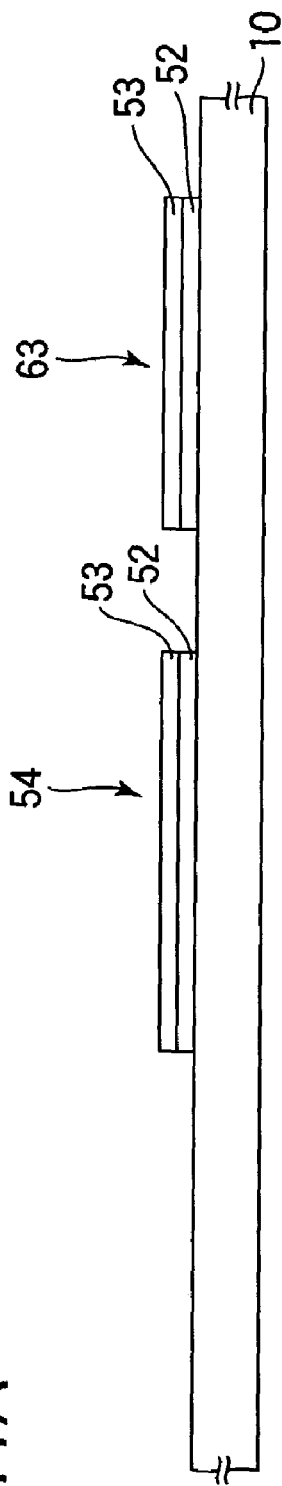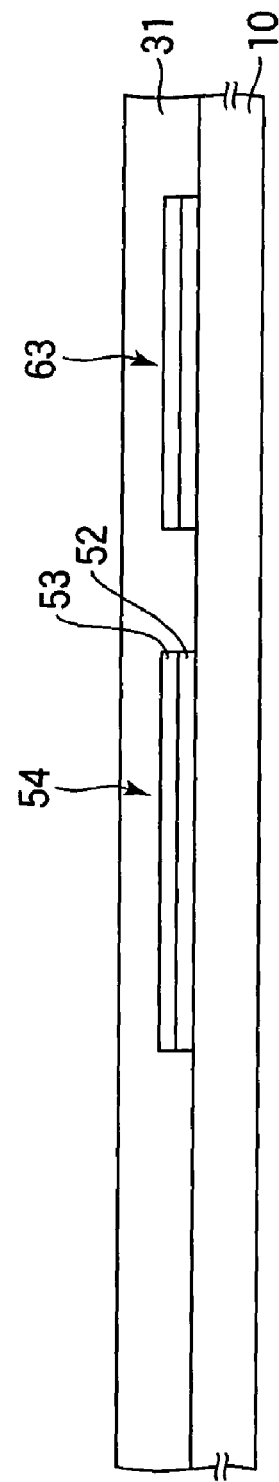
FIG.11A
FIG.11B

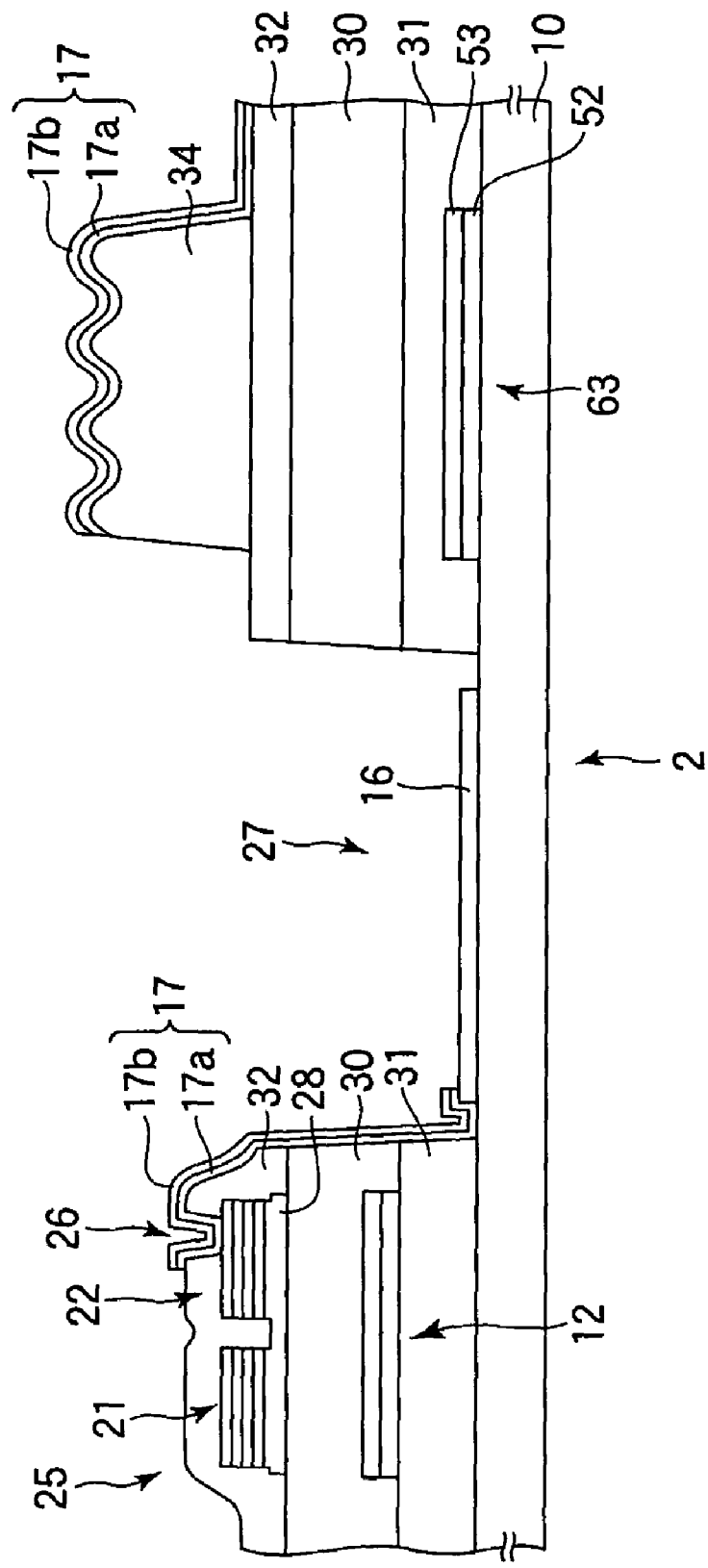

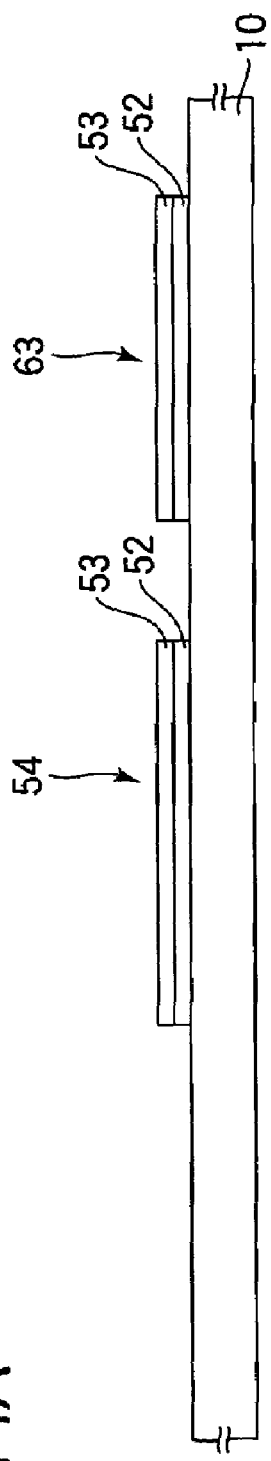
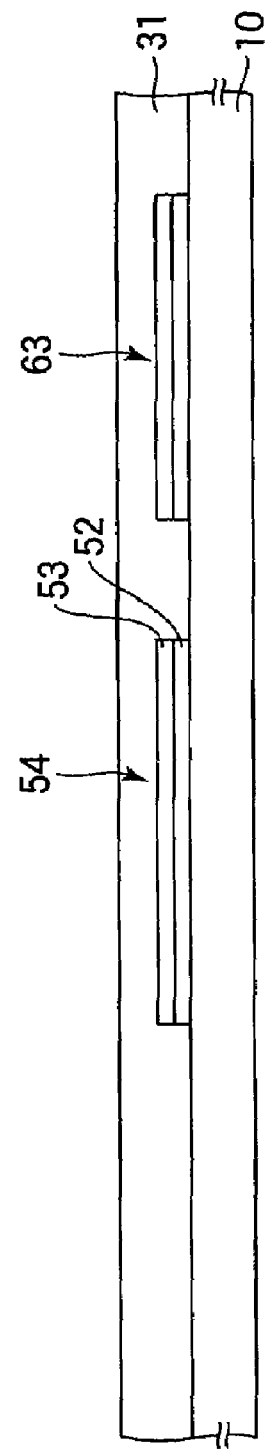
FIG.14A
FIG.14B

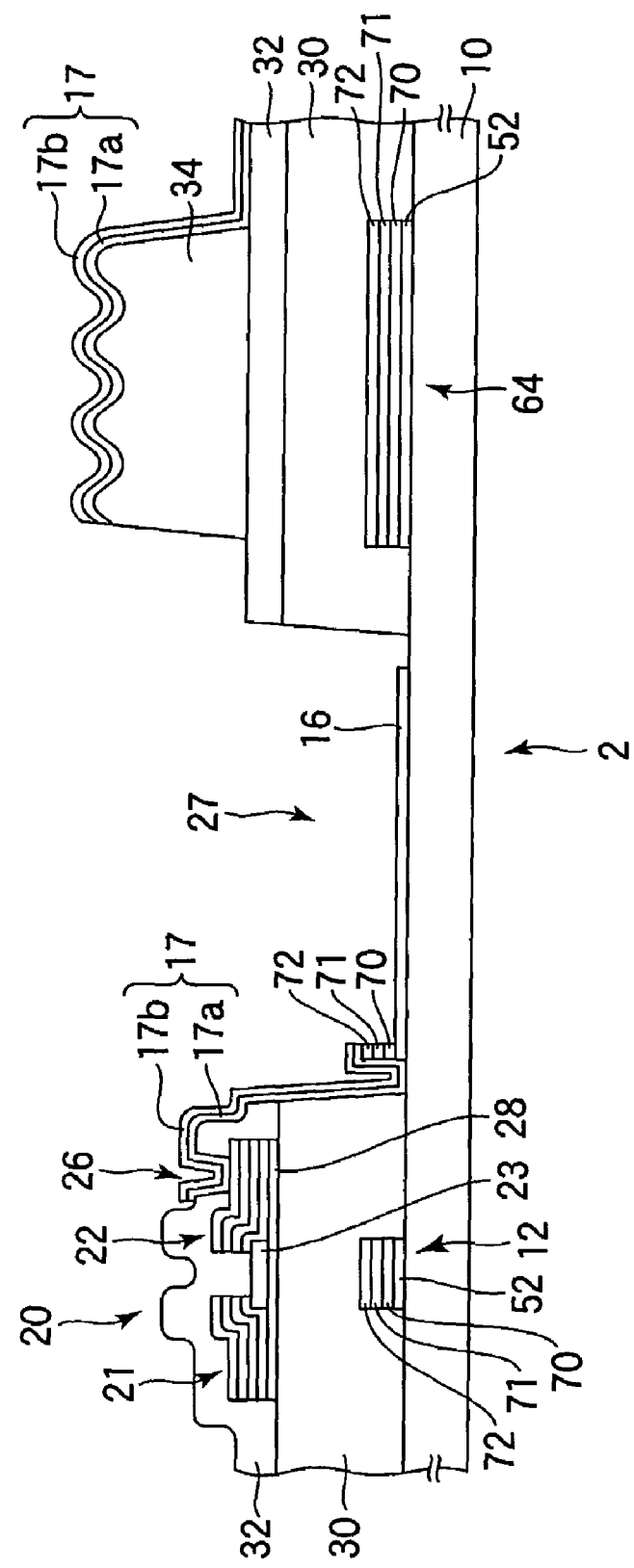

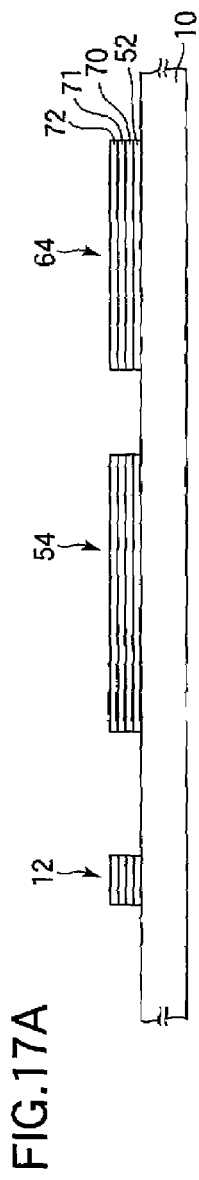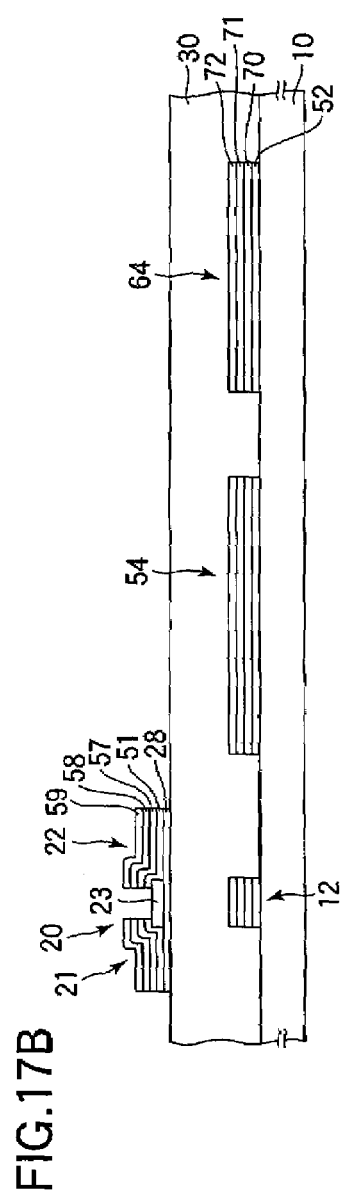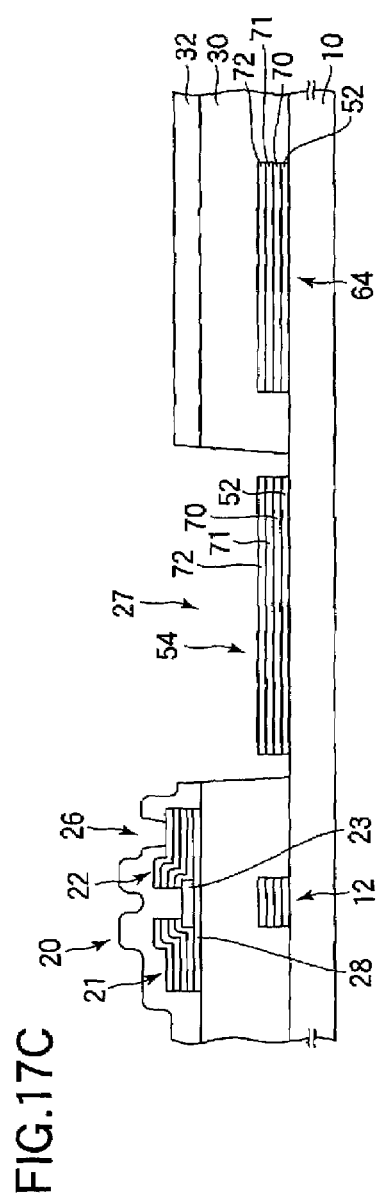
FIG.17A
FIG.17B
FIG.17C

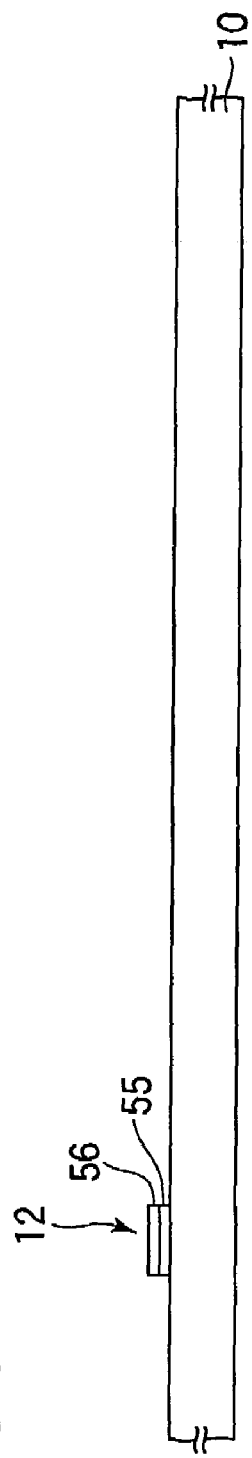
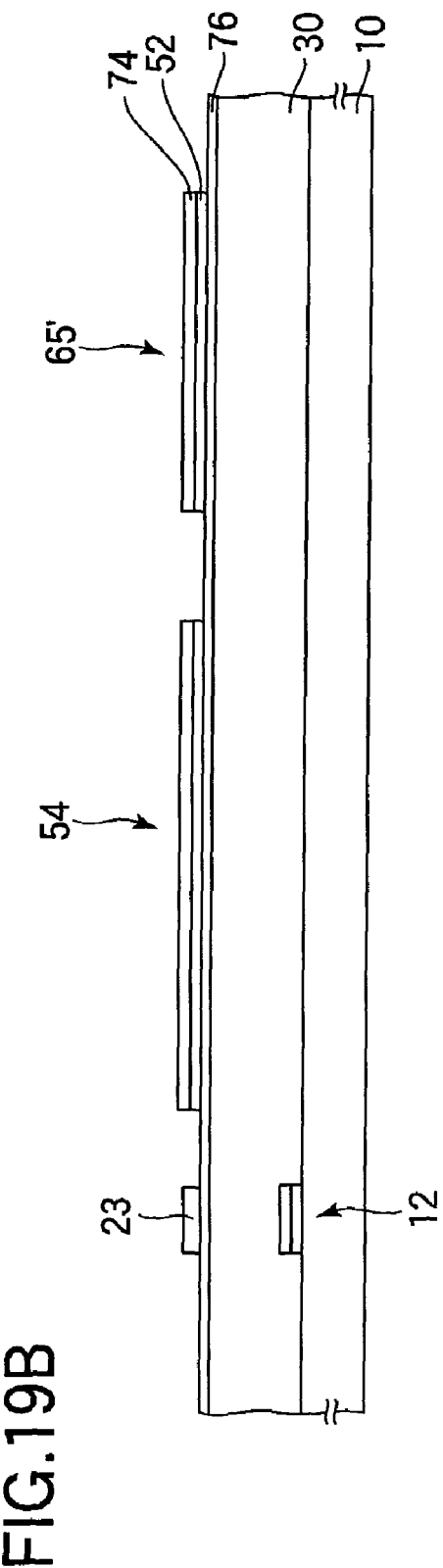
FIG.19A
FIG.19B

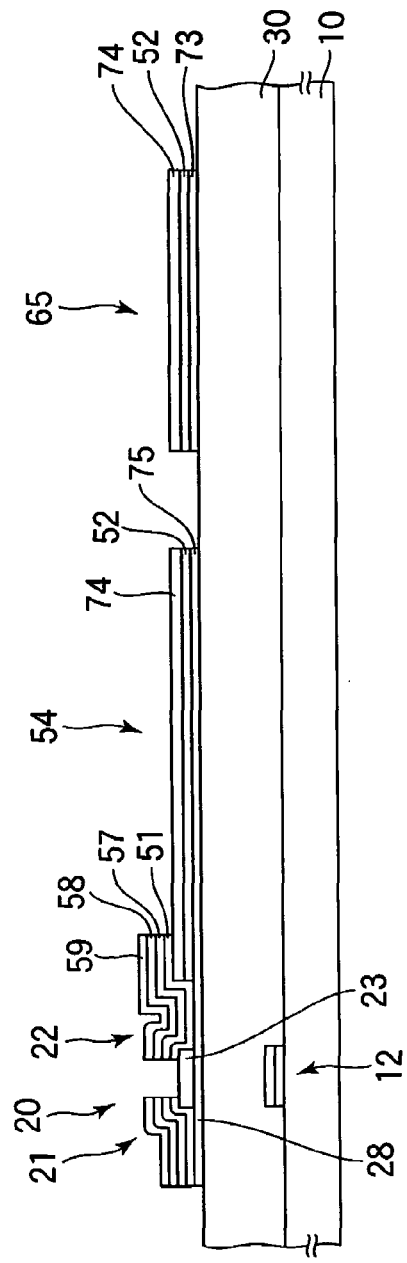
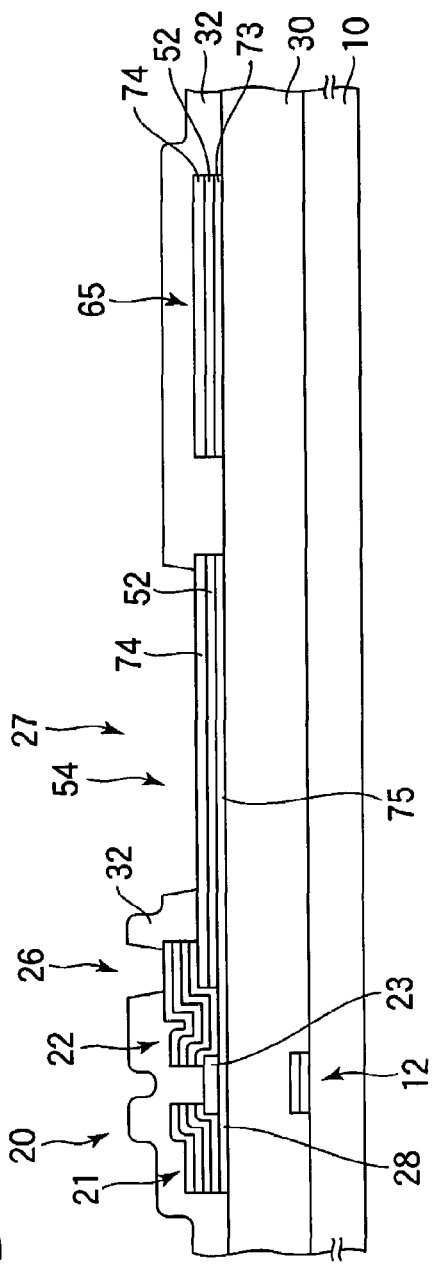
FIG.20A
FIG.20B

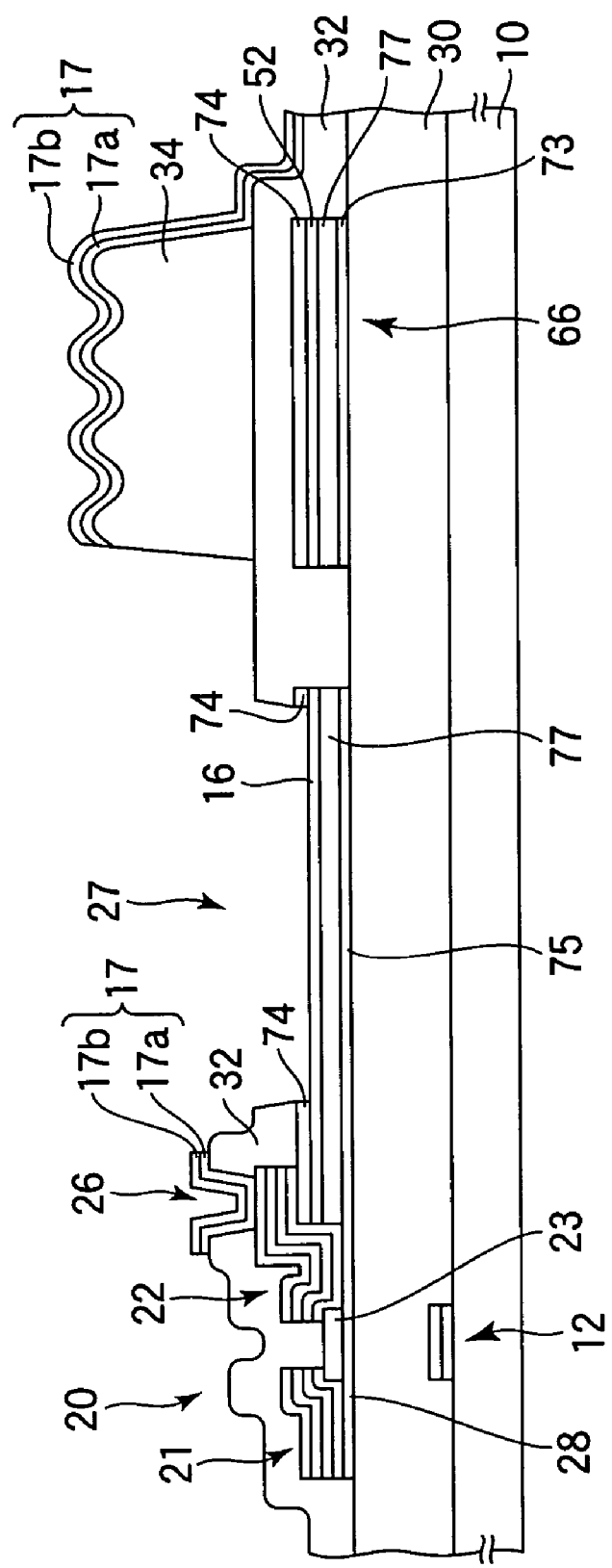

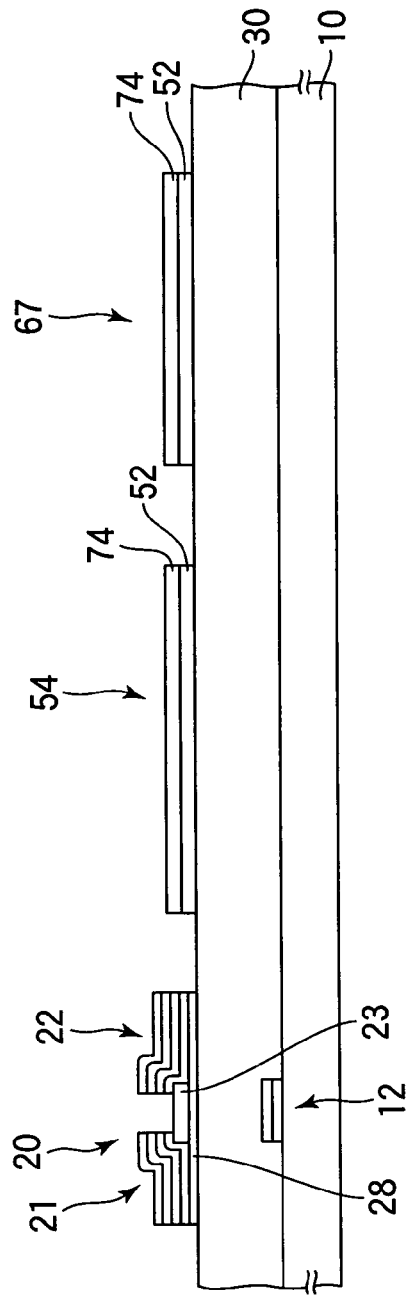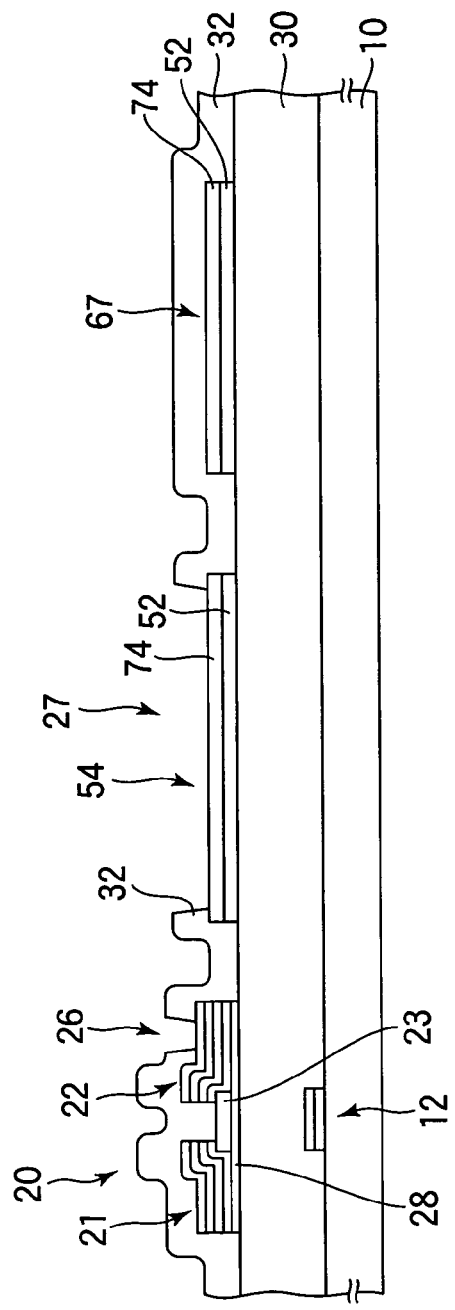

LIQUID CRYSTAL DISPLAY SUBSTRATE, METHOD OF MANUFACTURING THE SAME, AND LIQUID CRYSTAL DISPLAY DEVICE HAVING THE SAME

BACKGROUND OF THE INVENTION

1. Field of the Invention

The present invention relates to a liquid crystal display substrate, a method of manufacturing the same, and a liquid crystal display device having the same, and more particularly, it relates to such a substrate for transreflective liquid crystal display that can attain display in both a transmission mode and a reflection mode, a method of manufacturing the same, and a liquid crystal display device having the same.

2. Description of the Related Art

In recent years, liquid crystal devices are demanded to have higher performance. According to spread of mobile phones and mobile electronic devices, in particular, they are strongly demanded to attain low electric energy consumption and good usability out of doors. In order to attain low electric energy consumption and good usability out of doors, a reflection liquid crystal display device has been proposed, which has a pixel electrode having light reflection capability (a reflection electrode) and attains display by reflecting outside light to make a light source device unnecessary.

A thin film transistor (TFT) substrate of a reflection liquid crystal display device has a reflection electrode formed thereon with a metallic thin film having high light reflectivity. In the reflection liquid crystal display device, natural light incident thereon from the display screen side or light emitted by utilizing electricity is reflected by the reflection electrode on the TFT substrate, and the reflected light is used as a light source for liquid crystal display. The reflection electrode has an uneven surface. The uneven surface of the reflection electrode can be obtained by previously forming a light-sensitive resin layer having an uneven surface as an underlayer of the reflection electrode. The light incident from the display screen side is diffusely reflected by the uneven surface of the reflection electrode to obtain high luminance and a large viewing angle.

In the reflection liquid crystal display devices disclosed in JP-A-2002-221716 and JP-A-2002-296585, for example, a surface (an upper layer portion) of an overcoat layer formed with a resin material is applied to predetermined energy to make the upper layer portion be relatively cured in comparison to a lower layer portion, and then the overcoat layer is subjected to a heat treatment at a temperature equal to or higher than the heat curing point thereof, whereby wrinkled unevenness is formed on the surface of the overcoat layer.

A transreflective liquid crystal display device is also proposed, which can attain display in a transmission mode in addition to display in a reflection mode as similar to the reflection liquid crystal display device. In the transreflective liquid crystal display device, a transmission area having a transparent electrode formed with a light transmission material and a reflection area having a reflection electrode formed with a light reflection material are formed on each of pixel areas. The reflection electrode of the transreflective liquid crystal display device is formed on a resin layer having an uneven surface, as similar to the reflection liquid crystal display device. The transreflective liquid crystal display device referred herein includes a slightly transmission liquid crystal display device, which has an increased proportion of the reflection area in pixel areas to improve display luminance in a reflection mode, and a slightly reflection liquid crystal display device, which has an increased proportion of the transmission area in pixel areas to improve display luminance in a transmission mode.

FIG. 27A is a plan view showing a constitution of a TFT substrate of a conventional transreflective liquid crystal display device. FIG. 27B is a cross sectional view showing the TFT substrate shown in FIG. 27A on line X-X. As shown in FIGS. 27A and 27B, a glass substrate 110 of the TFT substrate 102 has a plurality of gate bus lines 112 extending in parallel to each other in the landscape direction in FIG. 27A (provided that only one of them is shown in FIGS. 27A and 27B).

An insulating film 130 is formed on the gate bus lines 112 on the entire surface of the substrate (which is sometimes referred to as agate insulating film, depending on the position where the film is formed). A plurality of drain bus lines 114 are formed extending in parallel to each other in the portrait direction in FIG. 27A as intersecting the gate bus lines 112 with the insulating film 130 intervening therebetween (provided that only two of the drain bus lines 114 are shown in FIG. 27A). TFTs 120 are formed in the vicinities of positions where the gate bus lines 112 and the drain bus lines 114 are intersected each other.

The TFT 120 has an active semiconductor layer 128 formed with an a-Si layer on the insulating film 130. A channel protective film 123 is formed on the active semiconductor layer 128. The gate bus line 112 in an area immediately beneath the channel protective film 123 is configured to function as a gate electrode of the TFT 120. The channel protective film 123 has thereon a drain electrode 121 drawn from the adjacent drain bus line 114 and a source electrode 122 disposed to face the drain electrode 121 through a predetermined gap.

A protective film 132 is formed on the TFT 120 on the entire surface of the substrate. A wrinkled resin layer 134 having wrinkled unevenness on the surface thereof is formed on the protective film 132 in a reflection area of each of the pixel areas. A reflection electrode 117 is formed on the wrinkled resin layer 134. The reflection electrode 117 has a wrinkled uneven surface following the surface of the wrinkled resin layer 134. The reflection electrode 117 and the wrinkled resin layer 134 are formed to cover the TFT 120. Separately, a transparent electrode 116 is formed on the protective film 132 in a transmission area of each of the pixel areas. One pixel is constituted with the reflection area and the transmission area positioned on the adjacent upper side of the reflection electrode in FIG. 27A. The reflection electrode 117 and the transparent electrode 116 in the same pixel are electrically connected to each other. The transparent electrode 116 is electrically connected through a contact hole 124 to a source electrode 122 of a TFT 120 formed as an underlayer of a reflection electrode 117 of a pixel positioned on the adjacent upper side in FIG. 27A.

A storage capacitor bus line 118 is formed on the glass substrate 110 in parallel to the gate bus line 112 as extending in the landscape direction in FIG. 27A. The storage capacitor bus line 118 functions as one electrode of a storage capacitor. A storage capacitor electrode 119 is formed on the storage capacitor bus line 118 through the insulating film 130. The storage capacitor electrode 119 is electrically connected to the source electrode 122 and functions as the other electrode of the storage capacitor. A light leakage preventing film 140 is also formed on the glass substrate 110 in parallel to the gate bus line 112 and the storage capacitor bus line 118 in the landscape direction in FIG. 27A. The light leakage preventing film 140 is disposed to shielding the vicinity of the boundary between the reflection area and the transmission area from light, so as to prevent leakage of light caused by alignment failure of the liquid crystal in the vicinity of the boundary between the areas.

The wrinkled resin layer 134 in the TFT substrate 120 shown in FIGS. 27A and 27B is formed by the following procedures. A positive light-sensitive resin is coated on a whole surface of a glass substrate having TFTs and the like formed thereon to form a resin layer. The glass substrate is placed on an exposing stage in an exposing apparatus, and the resin layer is exposed through a photomask that shields areas to be reflection areas from light. By this, the resin layer is exposed on areas other than the reflection areas. Subsequently, the resin layer is developed to remove the resin layer in the exposed area by dissolving in a developer solution, whereby the resin layer in the non-exposed reflection areas remains as not dissolved in the developer solution. The surface of the remaining resin layer is irradiated with UV light to cure the upper layer portion of the resin layer. Subsequently, the resin layer is subjected to a heat treatment at a temperature equal to or higher than the heat curing point thereof, so as to form a wrinkled resin layer having wrinkled unevenness on the surface thereof.

In the step of exposing the resin layer, however, the light reflected by the surface of the exposing stage is also incident on the resin layer in the reflection areas. Accordingly, the resin layer in the reflection areas is exposed and cured to such an extent that it is not dissolved in the developer solution. In general, the surface of the exposing stage has grooves formed thereon. Therefore, the intensity of the light incident on the resin layer in the reflection areas varies depending on the presence and absence of the grooves on the surface of the exposing stage, and thus, the extent of curing of the resin layer varies depending on the positions of the grooves. Accordingly, uniform wrinkled unevenness cannot be formed on the surface of the resin layer in the subsequent step to fluctuate the shape of wrinkled unevenness corresponding to the positions of the grooves on the surface of the exposing stage. Consequently, a transreflective liquid crystal display device thus manufactured has such a problem that display ununiformity corresponding to the positions of the grooves on the surface of the exposing stage is viewed upon display in a reflection mode, so as to fail to obtain an intended reflectivity and good reflection uniformity.

SUMMARY OF THE INVENTION

An object of the invention is to provide a liquid crystal display substrate capable of providing good reflection display characteristics, a method of manufacturing the same, and a liquid crystal display device having the same.

The aforementioned object of the invention can be attained by a liquid crystal display substrate containing: a plurality of pixel areas each having at least a portion thereof a reflection area reflecting light incident from a front surface side of the substrate; a wrinkled resin layer formed with a positive light-sensitive resin in the reflection area, the wrinkled resin layer having at least a portion thereof a wrinkled surface; a reflection electrode formed with a light reflection material on the wrinkled resin layer, the reflection electrode having a wrinkled surface following the surface of the wrinkled resin layer; and a light shielding portion formed as an underlayer of the wrinkled resin layer, the light shielding portion shielding light incident from a back surface of the substrate.

According to the invention, such a liquid crystal display device can be realized that provides good reflection display characteristics.

BRIEF DESCRIPTION OF THE DRAWINGS

FIG. 10 is a cross sectional view showing a constitution of a liquid crystal display substrate according to a fifth embodiment of the invention;

FIGS. 11A and 11B are cross sectional views showing a method of manufacturing a liquid crystal display substrate according to the fifth embodiment of the invention;

FIG. 13 is a cross sectional view showing a constitution of a liquid crystal display substrate according to a sixth embodiment of the invention;

FIGS. 14A and 14B are cross sectional views showing a method of manufacturing a liquid crystal display substrate according to the sixth embodiment of the invention;

FIG. 16 is a cross sectional view showing a constitution of a liquid crystal display substrate according to a seventh embodiment of the invention;

FIGS. 17A to 17C are cross sectional views showing a method of manufacturing a liquid crystal display substrate according to the seventh embodiment of the invention;

FIGS. 19A and 19B are cross sectional views showing a method of manufacturing a liquid crystal display substrate according to the eighth embodiment of the invention;

FIGS. 20A and 20B are cross sectional views showing a method of manufacturing a liquid crystal display substrate according to the eighth embodiment of the invention;

FIG. 21 is a cross sectional view showing a constitution of a liquid crystal display substrate according to a ninth embodiment of the invention;

FIGS. 26A and 26B are cross sectional views showing a method of manufacturing a liquid crystal display substrate according to the tenth embodiment of the invention.

DESCRIPTION OF THE PREFERRED EMBODIMENTS

First Embodiment

Figure 1:
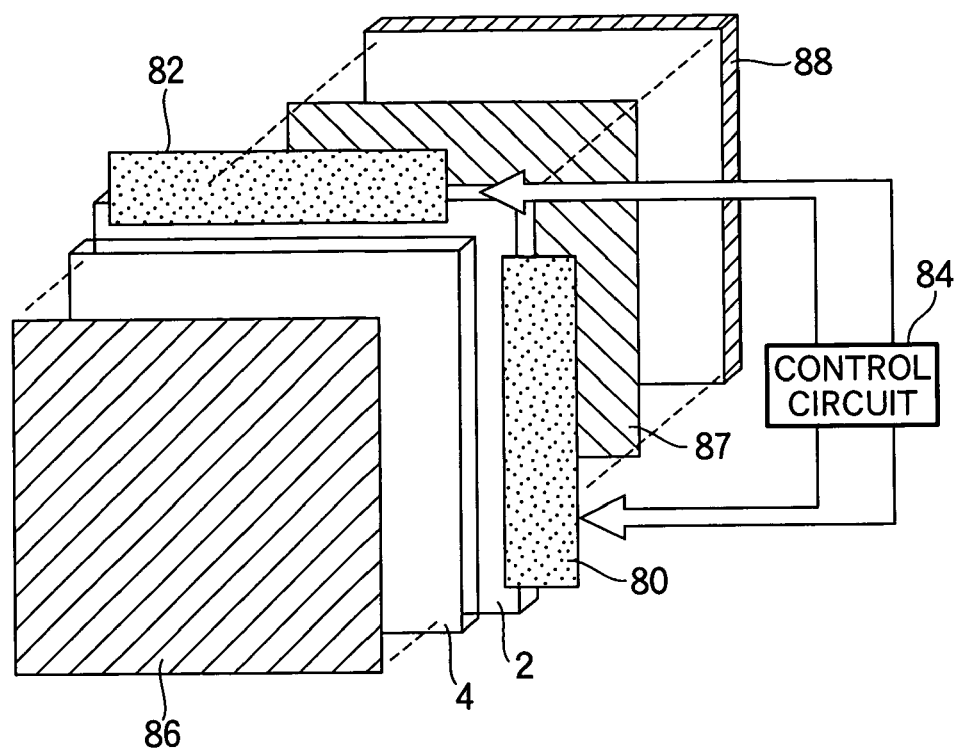
FIG. 1 is a schematic diagram showing a constitution of a liquid crystal display device according to a first embodiment of the invention.

A liquid crystal display substrate according to a first embodiment of the invention and a liquid crystal display device using the same will be described with reference to FIGS. 1 to 4B. FIG. 1 is a schematic diagram showing a constitution of a transreflective liquid crystal display device according to a first embodiment of the invention. As shown in FIG. 1, the transreflective liquid crystal display device has such a structure that a transparent electrode formed with a light transmission material, a reflection electrode formed with a light reflection material and a TFT substrate 2 having a TFT and the like formed in each of pixel areas are attached to an opposite substrate 4 having a common electrode, a CF layer and the like as facing each other, and a liquid crystal is sealed between them.

The TFT substrate 2 has a gate bus line driving circuit 80 having a driver IC mounted thereon for driving the plurality of gate bus lines and a drain bus line driving circuit 82 having a driver IC mounted thereon for driving the plurality of drain bus lines. The driving circuits 80 and 82 output a scanning signal and a data signal to the predetermined gate bus line or drain bus line based on the predetermined signal output from a control circuit 84.

The opposite substrate 4 has a CF layer having one color selected from red (R), green (G) and blue (B) formed for each pixel areas. The facing surfaces of the substrates 2 and 4 have alignment films for aligning the liquid crystal molecules to a predetermined direction. The TFT substrate 2 has, on the surface opposite to that having an element formed, a polarizing plate 87 attached thereto. A backlight unit 88 is disposed on the side of the polarizing plate 87 opposite to the TFT substrate 2. On the contrary, a polarizing plate 86 is attached to the surface of the opposite substrate 4 opposite to that having the CF layer formed.

Figure 2:
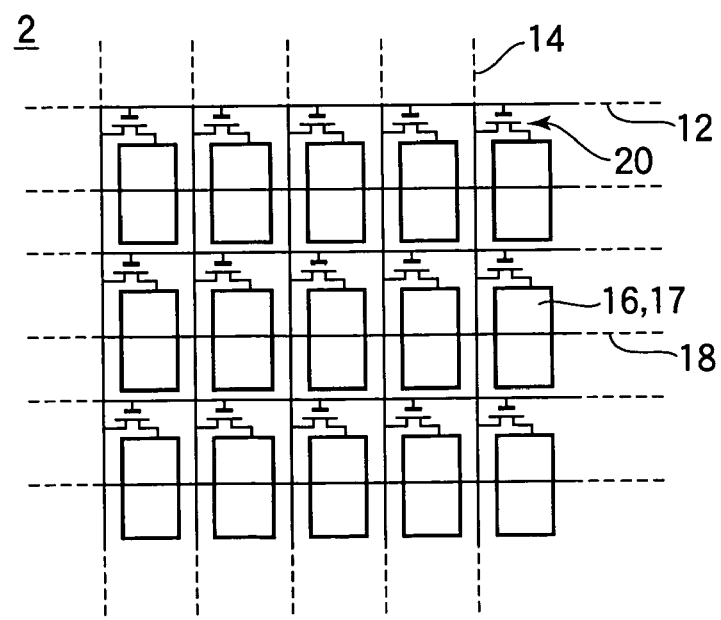
FIG. 2 is a schematic diagram showing an equivalent circuit of a liquid crystal display substrate according to the first embodiment of the invention.
Figure 3A:
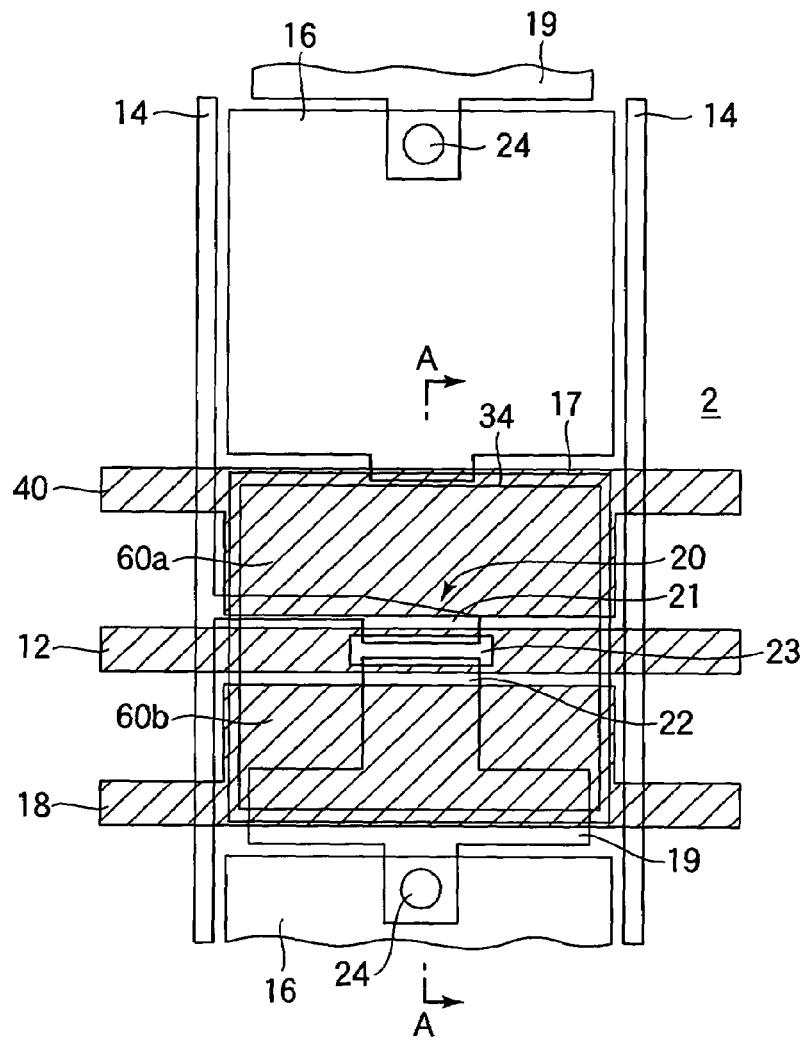
FIGS. 3A and 3B are a plan view and a cross sectional view showing a constitution of a liquid crystal display substrate according to the first embodiment of the invention.
Figure 3B:
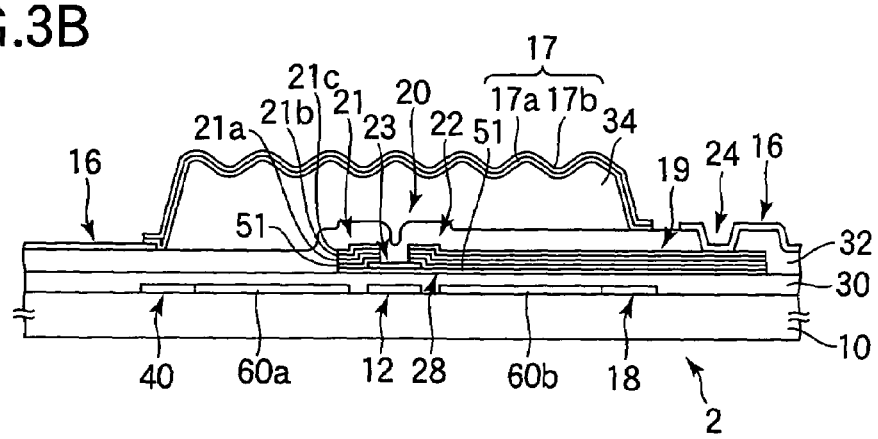

FIG. 2 is a schematic diagram showing an equivalent circuit of the element formed on the TFT substrate 2. FIG. 3A is a plan view showing the constitution of approximately one pixel area of the TFT substrate 2, and FIG. 3B is a cross sectional view showing the constitution of the TFT substrate 2 on line A-A in FIG. 3A. As shown in FIGS. 2, 3A and 3B, a glass substrate 10 of the TFT substrate 2 has the plurality of gate bus lines 12 extending in parallel to each other in the landscape direction in FIGS. 2 and 3A (provided that only one of them is shown in FIG. 3A).

An insulating film (gate insulating film) 30 is formed on the gate bus lines 12 on the entire surface of the substrate. The plurality of drain bus lines 14 are formed extending in parallel to each other in the portrait direction in FIGS. 2 and 3A as intersecting the gate bus lines 12 with the insulating film 30 intervening therebetween (provided that only two of the drain bus lines 14 are shown in FIG. 3A). A channel protective film type TFTs 20, for example, are formed in the vicinities of positions where the gate bus lines 12 and the drain bus lines 14 are intersected each other.

The TFT 20 has an active semiconductor layer 28 formed with an a-Si layer on the insulating film 30. A channel protective film 23 is formed on the active semiconductor layer 28. On the channel protective film 23, a drain electrode 21 withdrawn from the adjacent drain bus line 14 and an n$^+$a-Si layer 51 as an under ohmic contact layer thereof, and a source electrode 22 and a lower n$^+$a-Si layer 51 as an underlayer thereof are formed to face each other through a predetermined gap. The drain electrode 21 and the source electrode 22 each has, for example, an accumulated layer structure having a titanium (Ti) layer 21a, an aluminum (Al) layer 21b and a Ti layer (21c). In this constitution, the gate bus line 12 immediately beneath the channel protective film 23 functions as a gate electrode of the TFT 20.

A protective film 32 is formed on the TFT 20 on the entire surface of the substrate. A wrinkled resin layer 34 having wrinkled unevenness on the surface thereof is formed on the protective film 32 in a reflection area of each of the pixel areas. The wrinkled resin layer 34 is formed by using a positive light-sensitive resin. A reflection electrode 17 is formed on the wrinkled resin layer 34. The reflection electrode 17 is formed with an electroconductive film having light reflection capability and has, for example, a structure having a Ti layer 17a and an Al layer 17b accumulated in this order. The reflection electrode 17 has a wrinkled uneven surface following the surface of the wrinkled resin layer 34. Light incident from the display screen side is diffusely reflected by the wrinkled surface of the reflection electrode 17 to obtain good reflection display characteristics. The reflection electrodes 17 formed on each of the pixels are disposed to cover the TFT 20 which drives the pixel adjacent lower side of the pixel in FIG. 3A.

Separately, a transparent electrode 16 is formed on the protective film 32 in a transmission area of each of the pixel areas. The transparent electrode 16 is formed with an electroconductive film having light transmissibility, such as ITO (indium tin oxide). One pixel is constituted with the reflection area and the transmission area positioned on the adjacent upper side of the reflection electrode in FIG. 3A. The reflection electrode 17 and the transparent electrode 16 in the same pixel are electrically connected to each other.

A storage capacitor bus line 18 is formed in parallel to the gate bus line 12 as extending in the landscape direction in FIGS. 2 and 3A. The storage capacitor bus line 18 is formed with the same material as the gate bus line 12. A storage capacitor electrode 19 is formed on the storage capacitor bus line 18 for each of the pixels through the insulating film 30. The storage capacitor electrode 19 is formed with the same material as the drain bus line 14. A light leakage preventing film 40 is also formed in parallel to the gate bus line 12 in the landscape direction in FIG. 3A. The light leakage preventing film 40 is disposed to shield the vicinity of the boundary between the reflection area and the transmission area from light, so as to prevent leakage of light caused by alignment failure of the liquid crystal in the vicinity of the boundary between the areas. The light leakage preventing film 40 is formed with the same material as the gate bus line 12 and the storage capacitor bus line 18, and is, for example, in an electrically floating state.

The TFT substrate 2 of this embodiment has, as an underlayer of the wrinkled resin layer 34 formed in the reflection area, light shielding portions 60a and 60b for shielding light incident from the back surface side of the glass substrate 10 (the lower side in FIG. 3B). The light shielding portions 60a and 60b are formed with the same material as the gate bus line 12, the storage capacitor bus line 18 and the light leakage preventing film 40 simultaneously therewith. The light shielding portion 60a is disposed between the light leakage preventing film 40 and the gate bus line 12. The light shielding portion 60a is electrically connected to the light leakage preventing film 40 and is electrically separated from the gate bus line 12. The light shielding portion 60b is disposed between the gate bus line 12 and the storage capacitor bus line 18. The light shielding portion 60b is electrically separated from the gate bus line 12 and is electrically connected to the storage capacitor bus line 18. A large proportion of the reflection area (i.e., the area having the wrinkled resin layer 34 formed) is shielded from light incident from the back surface side of the glass substrate 10 by the gate bus line 12, the storage capacitor bus line 18, the light leakage preventing film 40 and the light shielding portions 60a and 60b (with portions of the drain electrode 21 and the source electrode 22). In the area having the wrinkled resin layer 34 formed, the proportion of the area shielded from light incident from the back surface side of the glass substrate 10 is preferably higher, for example, 30% or more.

The TFT 20, the bus lines 12, 14 and 18, the light leakage preventing film 40 and the light shielding portions 60a and 60b are formed by the photolithography process through a series of steps of semiconductor process, i.e., forming of a film, coating of a resist, exposure, development, etching, and removal of resist.

According to this embodiment, in the step of patterning a positive light-sensitive resin layer for forming the wrinkled resin layer 34 in the reflection area, reflected light on the exposing stage in the exposing apparatus is shielded by the light shielding portions 60a and 60b, and thus the light is substantially not incident on the light-sensitive resin layer in the reflection area. Therefore, a heat treatment by applying energy to the surface thereof in the subsequent step provides such a wrinkled resin layer 34 that has uniform wrinkled unevenness formed thereon. Consequently, the reflection electrode 17 formed on the wrinkled resin layer 34 also has uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics. Furthermore, since the light shielding portions 60a and 60b are formed in the same process step as the gate bus line 12, the storage capacitor bus line 18 and the light leakage preventing film 40, no process step is added to the manufacturing method of the TFT substrate 2.

Figure 4A:
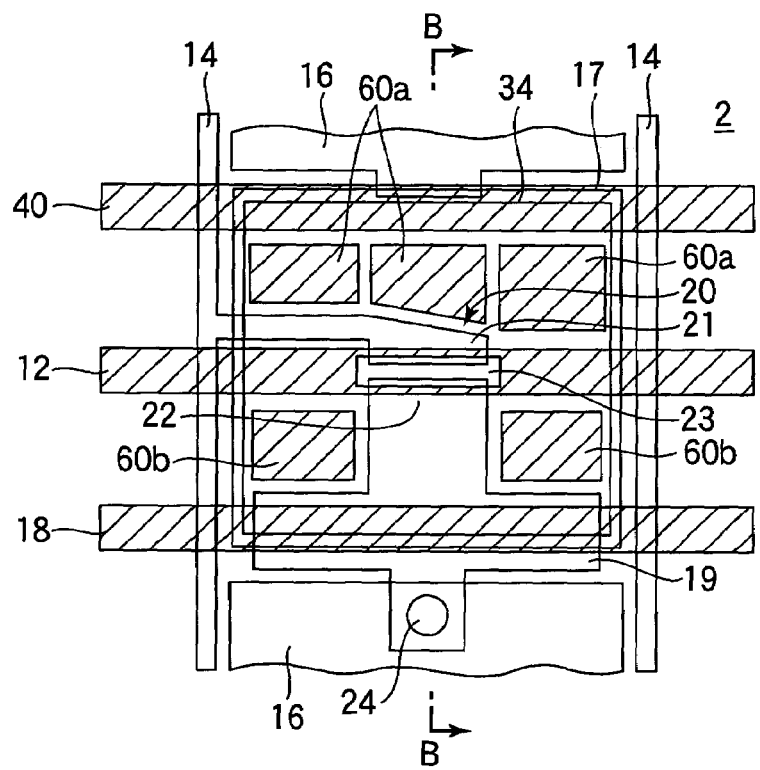
FIGS. 4A and 4B are a plan view and a cross sectional view showing a constitution of a liquid crystal display substrate according to a modified example of the first embodiment of the invention.
Figure 4B:
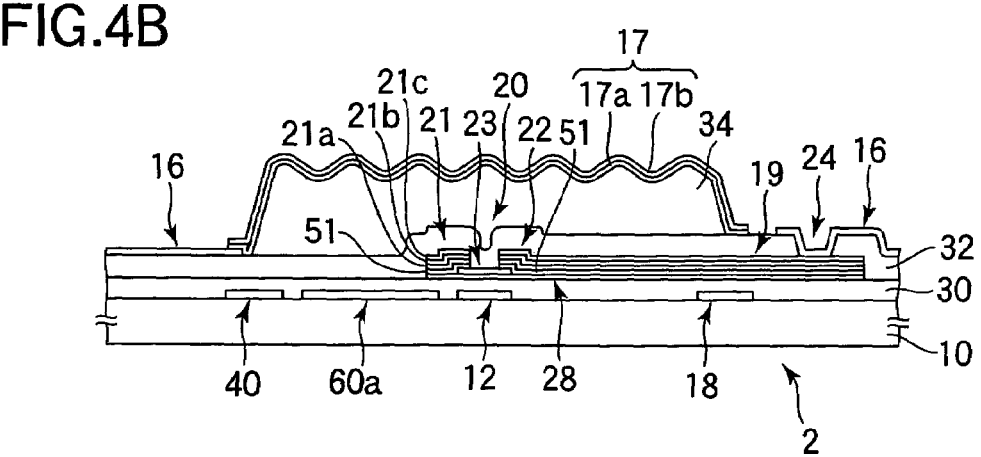

A modified example of the constitution of the liquid crystal display substrate of this embodiment will be described with reference to FIGS. 4A and 4B. FIG. 4A is a plan view showing the constitution of the vicinity of the reflection area of one pixel area of the TFT substrate 2 according to this modified example, and FIG. 4B is a cross sectional view showing the constitution of the TFT substrate 2 on line B-B in FIG. 4A. In this modified example, as shown in FIGS. 4A and 4B, the light shielding portions 60a and 60b each is divided into plural portions, and is electrically separated from the light leakage preventing film 40 and the storage capacitor bus line 18, as different from the constitution shown in FIGS. 3A and 3B. The modified example is the same as the constitution shown in FIGS. 3A and 3B in such a standpoint that the light shielding portions 60a and 60b are formed with the same material as the gate bus line 12 and the like.

The three portions of the light shielding portion 60a formed between the gate bus line 12 and the light leakage preventing film 40 are electrically separated from both the gate bus line 12 and the light leakage preventing film 40 and thus is in a floating state. The two portions of the light shielding portion 60b formed between the gate bus line 12 and the storage capacitor bus line 18 are electrically separated from both the gate bus line 12 and the light leakage preventing film 40 and thus is in a floating state. In this modified example, even in the case where the light shielding portion 60a is shorted to one of the gate bus line 12 and the light leakage preventing film 40 due to contamination with electroconductive foreign matters or the like, the gate bus line 12 and the light leakage preventing film 40 are not shorted to each other. Similarly, even in the case where the light shielding portion 60b is shorted to one of the gate bus line 12 and the storage capacitor bus line 18, the gate bus line 12 and the storage capacitor bus line 18 are not shorted to each other. According to this modified example, therefore, the manufacturing yield of the TFT substrate 2 can be further improved, in addition to the similar effect as in the constitution shown in FIGS. 3A and 3B.

Second Embodiment

Figure 5A:
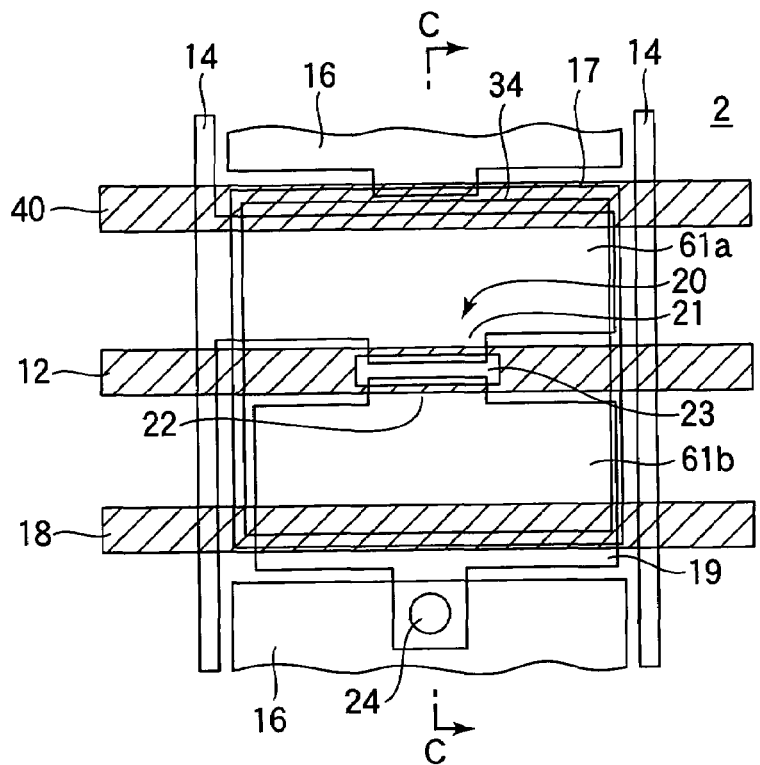
FIGS. 5A and 5B are a plan view and a cross sectional view showing a constitution of a liquid crystal display substrate according to a second embodiment of the invention.
Figure 5B:
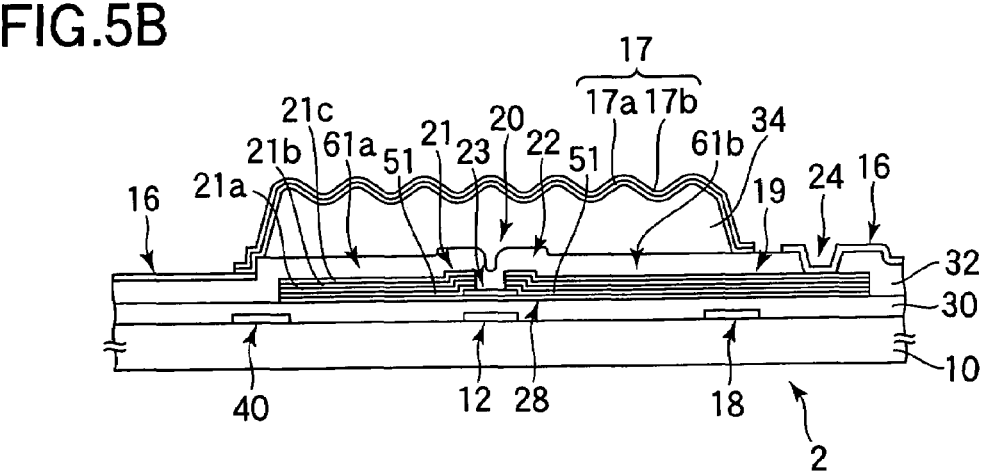

A liquid crystal display substrate according to a second embodiment of the invention will be described with reference to FIGS. 5A to 6B. FIG. 5A is a plan view showing the constitution of the vicinity of the reflection area of one pixel area of the TFT substrate 2 according to this embodiment, and FIG. 5B is a cross sectional view showing the constitution of the TFT substrate 2 on line C-C in FIG. 5A. As shown in FIGS. 5A and 5B, the TFT substrate 2 according to this embodiment has, as an underlayer of the wrinkled resin layer 34 formed in the reflection area, light shielding portions 61a and 61b for shielding light incident from the back surface side of the glass substrate 10 (the lower side in FIG. 5B). The light shielding portions 61a and 61b are formed with the same material as the drain bus line 14, the drain electrode 21, the source electrode 22 and the storage capacitor electrode 19 simultaneously therewith. The light shielding portion 61a is electrically connected to the drain bus line 14 and the drain electrode 21 and is disposed between the light leakage preventing film 40 and the gate bus line 12. The light shielding portion 61b is electrically connected to the source electrode 22 and the storage capacitor electrode 19 and is disposed between the gate bus line 12 and the storage capacitor bus line 18. A large proportion of the reflection area (i.e., the area having the wrinkled resin layer 34 formed) is shielded from light incident from the back surface side of the glass substrate 10 by the gate bus line 12, the storage capacitor bus line 18, the light leakage preventing film 40 and the light shielding portions 61a and 61b.

According to this embodiment, in the step of patterning a positive light-sensitive resin layer for forming the wrinkled resin layer 34 in the reflection area, reflected light on the exposing stage in the exposing apparatus is shielded by the light shielding portions 61a and 61b, and thus the light is substantially not incident on the light-sensitive resin layer in the reflection area, as similar to the first embodiment. Therefore, a heat treatment by applying energy to the surface thereof in the subsequent step provides such a wrinkled resin layer 34 that has uniform wrinkled unevenness formed thereon. Consequently, the reflection electrode 17 formed on the wrinkled resin layer 34 also has uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics. Furthermore, since the light shielding portions 61a and 61b are formed in the same process step as the drain bus line 14, the drain electrode 21, the source electrode 22 and the storage capacitor electrode 19, no process step is added to the manufacturing method of the TFT substrate 2.

Figure 6A:
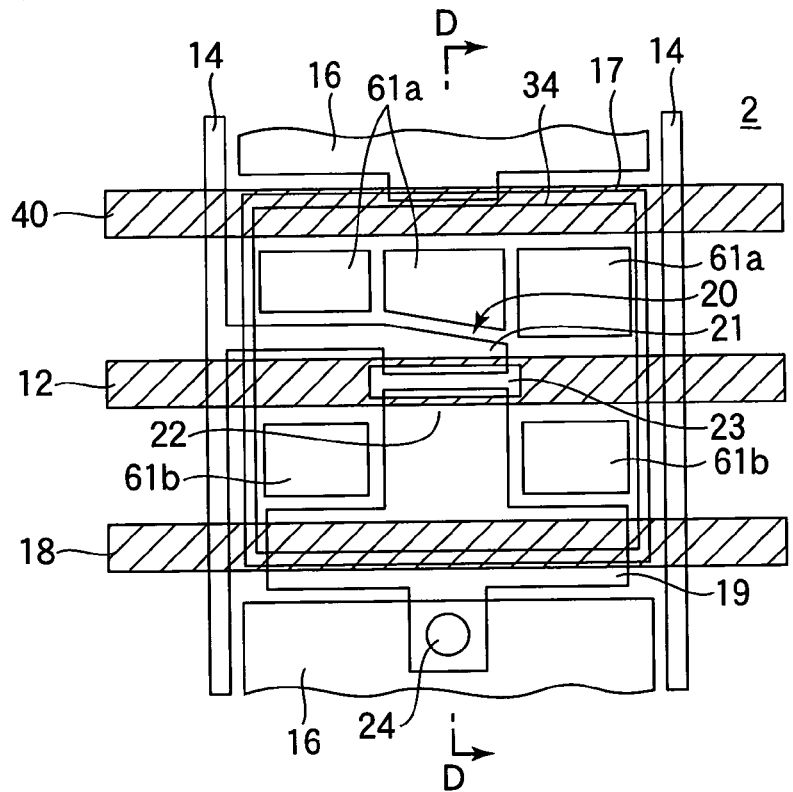
FIGS. 6A and 6B are a plan view and a cross sectional view showing a constitution of a liquid crystal display substrate according to a modified example of the second embodiment of the invention.
Figure 6B:
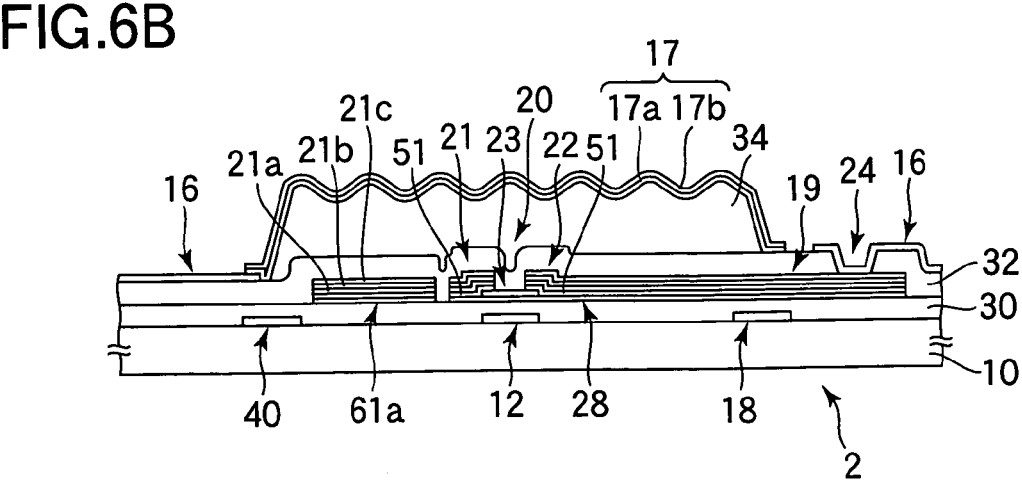

A modified example of the constitution of the liquid crystal display substrate of this embodiment will be described with reference to FIGS. 6A and 6B. FIG. 6A is a plan view showing the constitution of the vicinity of the reflection area of one pixel area of the TFT substrate 2 according to this modified example, and FIG. 6B is a cross sectional view showing the constitution of the TFT substrate 2 on line D-D in FIG. 6A. In this modified example, as shown in FIGS. 6A and 6B, the light shielding portions 61a and 61b each is divided into plural portions, and is electrically separated from the drain bus line 14, the drain electrode 21, the source electrode 22 and the storage capacitor electrode 19, as different from the constitution shown in FIGS. 5A and 5B. The modified example is the same as the constitution shown in FIGS. 5A and 5B in such a standpoint that the light shielding portions 61a and 61b are formed with the same material as the drain bus line 14 and the like.

The three portions of the light shielding portion 61a formed between the gate bus line 12 and the light leakage preventing film 40 are electrically separated from both the drain bus line 14 and the drain electrode 21 and thus is in a floating state. The two portions of the light shielding portion 61b formed between the gate bus line 12 and the storage capacitor bus line 18 are electrically separated from all the drain bus line 14, the source electrode 22 and the storage capacitor electrode 19 and thus is in a floating state. In this modified example, even in the case where the light shielding portion 61a is shorted to one of the two drain bus lines 14 adjacent to each other in the landscape direction of the pixel due to contamination with electroconductive foreign matters or the like, the two drain bus lines 14 are not shorted to each other. Similarly, even in the case where the light shielding portion 61b is shorted to one of the drain bus line 14 and the source electrode 22 (or the storage capacitor electrode 19), the drain bus line 14 and the source electrode 22 are not shorted to each other. According to this modified example, therefore, the manufacturing yield of the TFT substrate 2 can be further improved, in addition to the similar effect as in the constitution shown in FIGS. 5A and 5B.

Third Embodiment

Figure 7A:
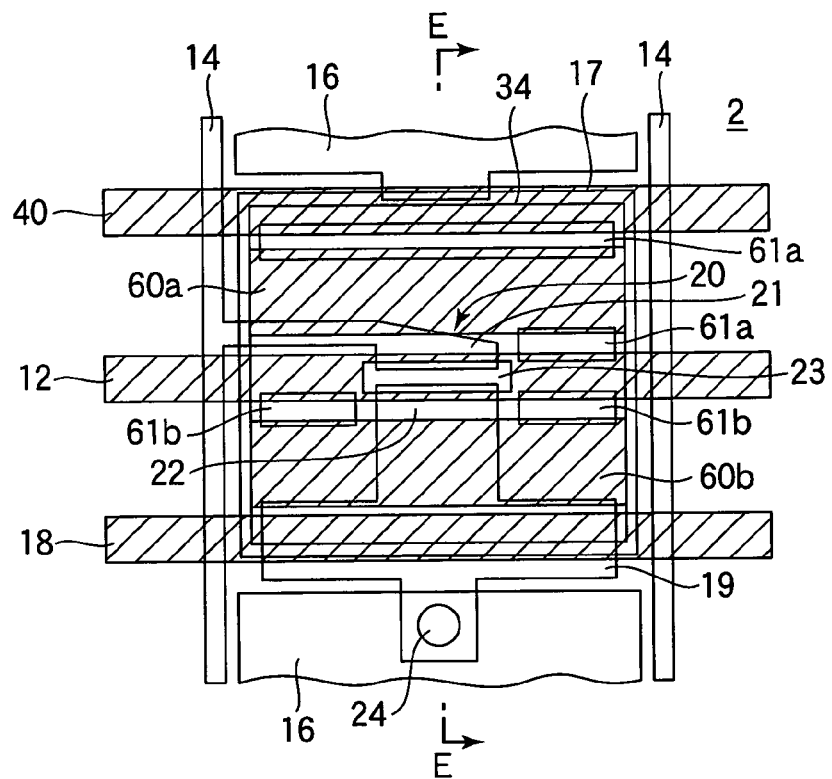
FIGS. 7A and 7B are a plan view and a cross sectional view showing a constitution of a liquid crystal display substrate according to a third embodiment of the invention.
Figure 7B:
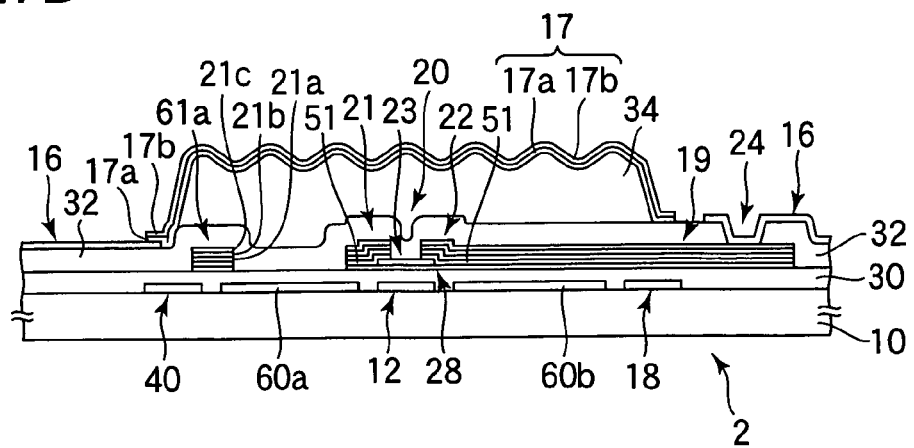

A liquid crystal display substrate according to a third embodiment of the invention will be described with reference to FIGS. 7A to 7B. FIG. 7A is a plan view showing the constitution of the vicinity of the reflection area of one pixel area of the TFT substrate 2 according to this embodiment, and FIG. 7B is a cross sectional view showing the constitution of the TFT substrate 2 on line E-E in FIG. 7A. As shown in FIGS. 7A and 7B, the TFT substrate 2 according to this embodiment has, as an underlayer of the wrinkled resin layer 34 formed in the reflection area, light shielding portions 60a, 60b, 61a and 61b for shielding light incident from the back surface side of the glass substrate 10 (the lower side in FIG. 7B). The light shielding portions 60a and 60b are formed with the same material as the gate bus line 12, the storage capacitor bus line 18 and the light leakage preventing film 40 simultaneously therewith. The light shielding portion 60a is disposed between the gate bus line 12 and the light leakage preventing film 40 and is electrically separated from both the gate bus line 12 and the light leakage preventing film 40. The light shielding portion 60b is disposed between the gate bus line 12 and the storage capacitor bus line 18 and is electrically separated from both the gate bus line 12 and the storage capacitor bus line 18.

At the position corresponding to the gap between the light leakage preventing film 40 and the light shielding portion 60a, the light shielding portion 61a is disposed through the insulating film 30 to overlap partly the light leakage preventing film 40 and the light shielding portion 60a. Similarly, at the position corresponding to the gap between the gate bus line 12 and the light shielding portion 60a, the light shielding portion 61a is disposed through the insulating film 30 to overlap partly the gate bus line 12 and the light shielding portion 60a. Furthermore, at the position corresponding to the gap between the gate bus line 12 and the light shielding portion 60b, the light shielding portion 61b is disposed through the insulating film 30 to overlap partly the gate bus line 12 and the light shielding portion 60b. The light shielding portions 61a and 61b are formed with the same material as the drain bus line 14, the drain electrode 21, the source electrode 22 and the storage capacitor electrode 19 simultaneously therewith. As described herein, in this embodiment, the light shielding portions are formed with different materials depending on the areas where the light shielding portions are formed. The substantially whole reflection area is shielded from light incident from the back surface side of the glass substrate 10 by the gate bus line 12, the storage capacitor bus line 18, the light leakage preventing film 40, the drain electrode 21, the source electrode 22, the storage capacitor electrode 19 and the light shielding portions 60a, 60b, 61a and 61b.

According to this embodiment, in the step of patterning a positive light-sensitive resin layer for forming the wrinkled resin layer 34 in the reflection area, reflected light on the exposing stage is shielded by the light shielding portions 60a, 60b, 61a and 61b, and thus the light is substantially not incident on the light-sensitive resin layer in the reflection area, as similar to the first and second embodiments. Therefore, a heat treatment by applying energy to the surface thereof in the subsequent step provides such a wrinkled resin layer 34 that has uniform wrinkled unevenness formed thereon. Consequently, the reflection electrode 17 formed on the wrinkled resin layer 34 also has uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics. Furthermore, since the light shielding portions 60a and 60b are formed in the same process step as the gate bus line 12, the storage capacitor bus line 18 and the light leakage preventing film 40, and the light shielding portions 61a and 61b are formed in the same process steps as the drain bus line 14, the drain electrode 21, the source electrode 22 and the storage capacitor electrode 19, no process step is added to the manufacturing method of the TFT substrate 2.

Fourth Embodiment

Figure 8A:
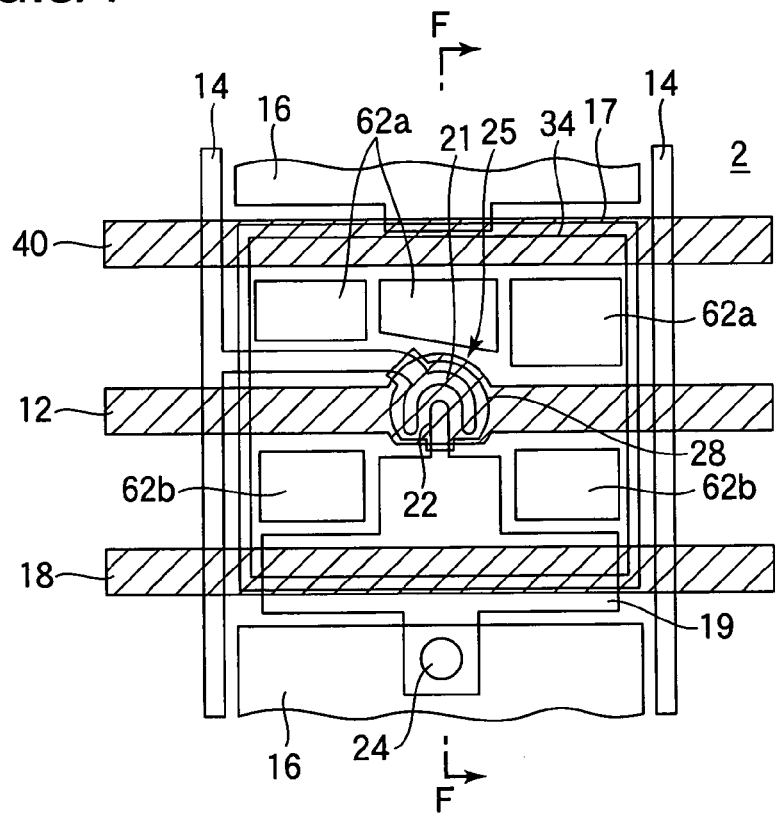
FIGS. 8A and 8B are a plan view and a cross sectional view showing a constitution of a liquid crystal display substrate according to a fourth embodiment of the invention.
Figure 8B:
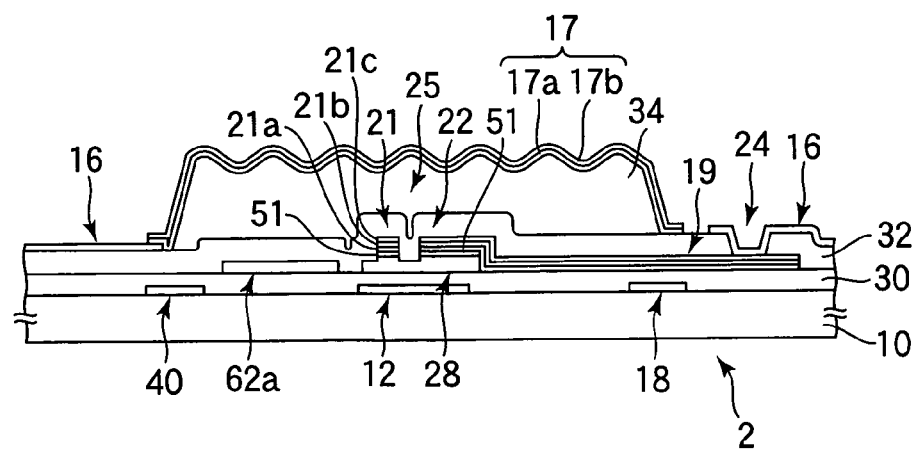

A liquid crystal display substrate according to a fourth embodiment of the invention will be described with reference to FIGS. 8A to 9B. FIG. 8A is a plan view showing the constitution of the vicinity of the reflection area of one pixel area of the TFT substrate 2 according to this embodiment, and FIG. 8B is a cross sectional view showing the constitution of the TFT substrate 2 on line F-F in FIG. 8A. As shown in FIGS. 8A and 8B, the TFT substrate 2 according to this embodiment has, as an underlayer of the wrinkled resin layer 34 formed in the reflection area, light shielding portions 62a and 62b for shielding light incident from the back surface side of the glass substrate 10 (the lower side in FIG. 8B). The TFT substrate 2 has a channel etching type TFT 25, which is different from the channel protective film type TFT 20 in the first to third embodiments.

The TFT 25 has an active semiconductor layer 28 formed with an a-Si layer on an insulating film 30. On the active semiconductor layer 28, a drain electrode 21 withdrawn from the adjacent drain bus line 14 and an n$^+$a-Si layer 51 as an underlayer thereof, and a source electrode 22 and a lower n$^+$a-Si layer 51 as an underlayer thereof are formed to face each other through a predetermined gap. For example, the source electrode 22 has a stick-like planar shape. The drain electrode 21 is disposed to surround the source electrode 22 in a C-shape. The channel area surface of the active semiconductor layer 28 is partly etched for ensuring separation and insulation between the drain electrode 21 and the source electrode 22. The active semiconductor layer 28 has a thickness, for example, of from 150 to 200 nm upon formation thereof, and the thickness of the active semiconductor layer 28 at the portion having a surface being etched is, for example, about 100 nm. The gate bus line 12 immediately beneath the active semiconductor layer 28 functions as a gate electrode of the TFT 25. The gate bus line 12 in this embodiment has a larger width in the area functioning as the gate electrode than that of the other areas.

The light shielding portions 62a and 62b are formed with the same material as the active semiconductor layer 28 of the TFT 25 simultaneously therewith. The light shielding portions 62a and 62b have a thickness of about 100 nm, which is substantially the same as the thickness of the active semiconductor layer 28 of the TFT 25 in the area having a surface being etched, and has a function of shielding (absorbing) light. As described herein, this embodiment utilizes such a constitution that the active semiconductor layer 28 of the channel etching type TFT 25 is formed to have a larger thickness than the active semiconductor layer 28 of the channel protective film type TFT 20 (for example, about from 30 to 50 nm). The light shielding portion 62a is disposed between the gate bus line 12 and the light leakage preventing film 40 and is electrically separated from the active semiconductor layer 28, the drain electrode 21, the drain bus line 14, the gate bus line 12 and the light leakage preventing film 40. The light shielding portion 62b is disposed between the gate bus line 12 and the storage capacitor bus line 18 and is electrically separated from the active semiconductor layer 28, the source electrode 22, the storage capacitor electrode 19, the gate bus line 12 and the storage capacitor bus line 18. A large proportion of the reflection area is shielded from light incident from the back surface side of the glass substrate 10 by the gate bus line 12, the storage capacitor bus line 18, the light leakage preventing film 40 and the light shielding portions 62a and 62b.

According to this embodiment, in the step of patterning a positive light-sensitive resin layer for forming the wrinkled resin layer 34 in the reflection area, reflected light on the exposing stage is shielded by the light shielding portions 62a and 62b, and thus the light is substantially not incident on the light-sensitive resin layer in the reflection area, as similar to the first to third embodiments. Therefore, a heat treatment by applying energy to the surface thereof in the subsequent step provides such a wrinkled resin layer 34 that has uniform wrinkled unevenness formed thereon. Consequently, the reflection electrode 17 formed on the wrinkled resin layer 34 also has uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics. Furthermore, since the light shielding portions 62a and 62b are formed in the same process step as the active semiconductor layer 28, no process step is added to the manufacturing method of the TFT substrate 2.

Figure 9A:
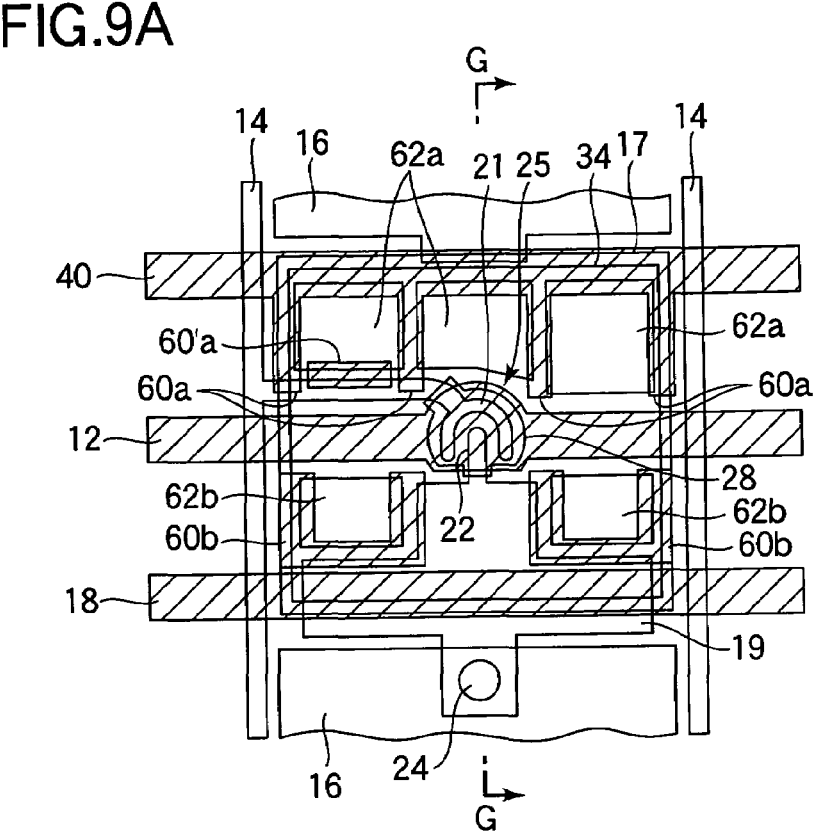
FIGS. 9A and 9B are a plan view and a cross sectional view showing a constitution of a liquid crystal display substrate according to a modified example of the fourth embodiment of the invention.
Figure 9B:
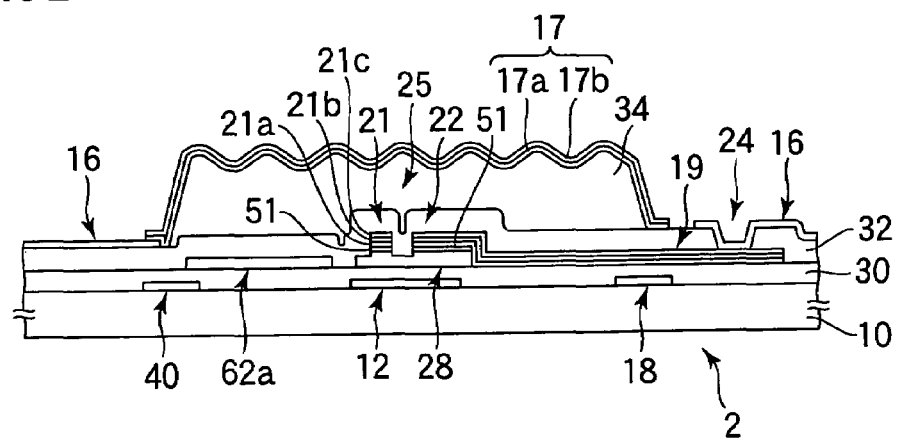

A modified example of the constitution of the liquid crystal display substrate of this embodiment will be described with reference to FIGS. 9A and 9B. FIG. 9A is a plan view showing the constitution of the vicinity of the reflection area of one pixel area of the TFT substrate 2 according to this modified example, and FIG. 9B is a cross sectional view showing the constitution of the TFT substrate 2 on line G-G in FIG. 9A. In this modified example, as shown in FIGS. 9A and 9B, the light shielding portion 62a partly overlaps the light leakage preventing film 40. At the gap between the two adjacent light shielding portions 62a (i.e., on the surrounding of the light shielding portion 62a), a light shielding portion 60a extending from the light leakage preventing film 40 is disposed, which is formed with the same material as the gate bus line 12 simultaneously therewith. At the gap between the light shielding portion 62a and the drain electrode 21, a light shielding portion 60a is disposed, which is formed with the same material as the light shielding portion 60a simultaneously therewith. Separately, a light shielding portion 60b, which is formed with the same material as the gate bus line 12 simultaneously therewith, is disposed on the surrounding of the light shielding portion 62b. The light shielding portion 60b is electrically separated from both the gate bus line 12 and the storage capacitor bus line 18. As described herein, in this modified embodiment, the light shielding portions are formed with different materials depending on the areas where the light shielding portions are formed. The substantially whole reflection area is shielded from light incident from the back surface side of the glass substrate 10 by the gate bus line 12, the storage capacitor bus line 18, the light leakage preventing film 40, the drain electrode 21, the source electrode 22, the storage capacitor electrode 19 and the light shielding portions 60a, 60a, 60b, 62a and 62b. According to this modified example, therefore, further uniform wrinkled unevenness can be formed on the reflection electrode 17 in comparison to the constitution shown in FIGS. 8A and 8B, so as to provide better reflection display characteristics.

Fifth Embodiment

A liquid crystal display substrate according to a fifth embodiment of the invention and a manufacturing method thereof will be described with reference to FIGS. 10 to 12B.

FIG. 10 is a cross sectional view showing a constitution of a TFT substrate 2 according to this embodiment. In FIG. 10, the area having a TFT 20 of a pixel formed therein is shown on the left side, a transmission area of the pixel is shown at the center, and a reflection area of the adjacent pixel is shown on the right side. As shown in FIG. 10, the TFT substrate 2 of this embodiment has an insulating film 31 as an underlayer of agate electrode (gate bus line) 12 of the channel protective film type TFT 20. A transparent electrode 116 is formed immediately above the glass substrate 10 in the transmission area. The surface of the transparent electrode 16 is exposed through an opening 27 where the protective film 32 and the insulating films 30 and 31 are removed. The transparent electrode 16 is electrically connected to the source electrode 22 of the TFT 20 through the reflection electrode 17. A light shielding portion 63 is formed as an underlayer of the insulating film 31 in the reflection area. The light shielding portion 63 has such a constitution that an ITO layer 52 formed with the same material as the transparent electrode 16 and a high melting point metal layer 53 having a light shielding capability are accumulated in this order and patterned into the same shape.

A manufacturing method of the liquid crystal display substrate according to this embodiment will be described. FIGS. 11A to 12B are cross sectional views showing the manufacturing method of the TFT substrate 2 according to this embodiment. As shown in FIG. 11A, an ITO layer 52 having a thickness, for example, of 70 nm and a high melting point metal layer 53 having a thickness, for example, of 100 nm are formed by sputtering directly on a glass substrate 10 as a transparent insulating substrate or after forming a protective film, such as $SiO_x$, thereon depending on necessity. By this, an electroconductive film having a thickness of about 170 nm having the ITO layer 52 and the high melting point metal layer 53 accumulated is formed on the whole surface of the substrate. Examples of the material for forming the high melting point metal layer 53 include Ti, chromium (Cr), molybdenum (Mo), tantalum (Ta), tungsten (W) and alloys thereof. A resist is then coated on the whole surface of the electroconductive film and patterned by using a first photomask (or a reticle) to form a resist pattern having a predetermined shape. Subsequently, wet etching by using, for example, a mixed reagent of acetic acid, nitric acid and phosphoric acid, and wet etching using, for example, a reagent, such as oxalic acid, are effected by using the resist pattern as an etching mask. Consequently, a light shielding portion 63 is formed on at least a portion of an area to be a reflection area, and an electroconductive film (electroconductive layer) 54 having a predetermined shape is formed on an area to be a transmission area.

As shown in FIG. 11B, by the plasma CVD process a silicon nitride film (SiN film) having a thickness, for example, of 200 nm is formed on the light shielding portion 63 and the electroconductive film 54 on the whole surface of the substrate to form an insulating film 31.

Figure 12A:
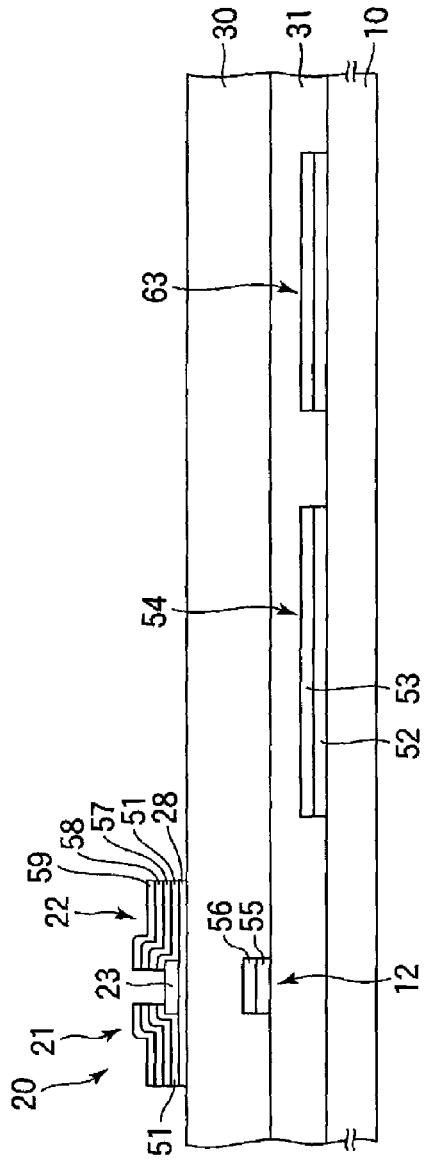
FIGS. 12A and 12B are cross sectional views showing a method of manufacturing a liquid crystal display substrate according to the fifth embodiment of the invention.

As shown in FIG. 12A, an Al layer (or an Al alloy layer) 55 having a thickness, for example, of 130 nm and a high melting point metal layer (such as a Ti layer or a Ti alloy layer) 56 having a thickness, for example, of 70 nm are formed in this order by sputtering on the insulating layer 31 on the whole surface of the substrate. Consequently, an electroconductive film having a thickness of 200 nm containing the Al layer 55 and the high melting point metal layer 56 accumulated is formed. Examples of the Al alloy include those materials that are obtained by adding one or plurality of neodymium (Nd), silicon (Si), copper (Cu), Ti, W, Ta and scandium (Sc) to Al. Examples of the high melting point metal include Cr, Mo, Ta, W and alloys thereof. A resist is then coated on the whole surface of the electroconductive film and patterned by using a second photomask to form a resist pattern having a predetermined shape. Subsequently, dry etching using, for example, a chlorine series gas is effected by using the resist pattern as an etching mask. Consequently, a gate bus line 12, a storage capacitor bus line 18 (not shown in the figure) and a gate bus line terminal (not shown in the figure) are formed.

An SiN film having a thickness, for example, of 400 nm is formed by the plasma CVD process on the gate bus line 12, the storage capacitor bus line 18 and the gate bus line terminal on the whole surface of the substrate, so as to form an insulating film (gate insulating film) 30. An a-Si layer having a thickness, for example, of 30 nm is then formed by the plasma CVD process on the whole surface of the insulating layer 30. Subsequently, an SiN film having a thickness, for example, of 150 nm is formed by the plasma CVD process on the whole surface of the a-Si layer. A resist is coated by spin coating on the whole surface of the SiN film to form a resist layer. The glass substrate 10 is then exposed from the back surface side thereof by using the gate bus line 12 as a mask. Subsequently, the glass substrate 10 is exposed from the front surface side thereof by using a third photomask. The resist layer is then developed, and the resist layer in the exposed area is removed by dissolution. Consequently, a resist pattern is formed in a self aligning manner only on the area for forming the channel protective film on the gate bus line 12. Dry etching using a fluorine series gas is then effected by using the resist pattern as an etching mask to form a channel protective film 23.

Immediately after cleaning the surface of the a-Si layer (removal of a spontaneous oxidized film) by using diluted hydrofluoric acid, an n$^+$a-Si layer having a thickness, for example, of 30 nm is formed on the whole surface of the substrate by the plasma process. A high melting point metal layer (such as a Ti layer or a Ti alloy layer) 57 having a thickness, for example, of 40 nm, an Al layer (or an Al alloy layer) 58 having a thickness, for example, of 75 nm and a high melting point metal layer (such as a Ti layer or a Ti alloy layer) 59 having a thickness, for example, of 80 nm are then formed by sputtering in this order to form an electroconductive film. Examples of the high melting point metal include Cr, Mo, Ta, W and alloys thereof. It is necessary that the high melting point metal layer 59 is not removed but remains upon removing by etching the high melting point metal layer 53 in the transmission area in the subsequent process step, and therefore, the materials for forming the high melting point metal layers 53 and 59 are selected under consideration of etching selectivity thereof (see FIG. 12B).

A resist is then coated on the whole surface of the electroconductive film and patterned by using a fourth photomask to form a resist pattern having a predetermined shape. The electroconductive film, the n$^+$a-Si layer and the a-Si layer are subjected to dry etching using a chlorine series gas by using the resist pattern as an etching mask. Consequently, a drain electrode 21 and a source electrode 22 of the TFT 20, an active semiconductor layer 28, a storage capacitor electrode 19 (not shown in the figure), a drain bus line 14 (not shown in the figure) and a drain bus line terminal (not shown in the figure) are formed. The channel protective film 23 functions as an etching stopper upon etching, and the a-Si layer as an underlayer thereof is not etched but remains. According to the aforementioned operations, a channel protective film type TFT 20 is formed.

Figure 12B:
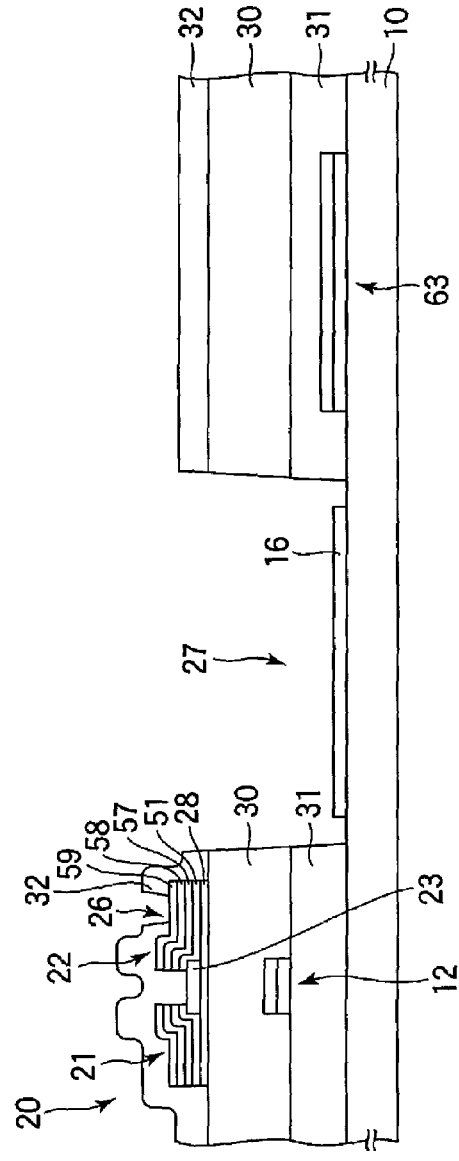

As shown in FIG. 12B, an SiN film having a thickness, for example, of 300 nm is formed by the plasma CVD process on the whole surface of the substrate to form a protective film 32. A resist is then coated on the whole surface of the protective film 32 and patterned by using a fifth photomask to form a resist pattern having a predetermined shape. The protective film 32 (and the insulating films 30 and 31) is subjected to dry etching using a mixed gas of a fluorine series gas and an $O_2$ gas by using the resist pattern as an etching mask. Consequently, a contact hole 26 on the source electrode 22, a contact hole (not shown in the figure) on the storage capacitor electrode 19 and a contact hole (not shown in the figure) on the gate bus line terminal and the drain bus line terminal are formed. Simultaneously, the protective film 32 and the insulating films 30 and 31 on the electroconductive film 54 in the transmission area are removed to form an opening 27. Subsequently, wet etching using a mixed reagent of acetic acid, nitric acid and phosphoric acid is effected. Consequently, the high melting point metal layer 53 as an upper layer of the electroconductive film 54 exposed through the opening 27 is removed, and the ITO layer 52 as a lower layer thereof remains, so as to form a transparent electrode 16.

A positive light-sensitive novolak resin, for example, is coated on the whole surface of the substrate by using a spin coater or a slit coater to form a light-sensitive resin layer having a thickness, for example, of about from 0.5 to 4 µm. Subsequently, the substrate is subjected to a heat treatment at a temperature of 160° C. or lower. The light-sensitive resin layer is then exposed by using a sixth photomask and is developed by using an alkali developer solution, such as TMAH (tetramethylammonium hydroxide), so as to form an overcoat (OC) layer (resin layer) having a predetermined shape. The OC layer is formed on at least a portion of the area to be the reflection area. In the exposing step for patterning, since the light shielding portion 63 is formed as an underlayer (i.e., on the side of the glass substrate 10) of the light-sensitive resin layer, light reflected on the exposing stage of the exposing apparatus is substantially not incident on the light-sensitive resin layer in the reflection area.

The OC layer is then annealed at a temperature of from 100 to 180° C. for from 0.2 to 60 minutes by using a clean oven or a hot plate. The surface of the OC layer is then irradiated with UV light having a wavelength of from 200 to 470 nm at an energy density of from 10 to 550 mJ/cm$^2$ for from 5 to 300 seconds. The OC layer is then annealed by using a clean oven or the like at a temperature equal to or higher than the heat curing point thereof (from 180 to 230° C.) for about 1 hour. Consequently, a wrinkled resin layer 34 having wrinkled unevenness on the surface thereof is formed in the reflection area (see FIG. 10). As described in the foregoing, in this embodiment, light reflected by the exposing stage of the exposing apparatus is substantially not incident on the light-sensitive resin in the reflection area, and therefore, a wrinkled resin layer 34 having uniform wrinkled unevenness can be obtained through the subsequent UV light irradiation and heat treatment.

In the constitution shown in FIGS. 3A and 3B, for example, there is such a possibility that reflected light from the exposing stage is incident through the gap between the light shielding portions 60a and 60b and the gate bus line 12. Therefore, there is such a possibility that the wrinkled unevenness is deformed in a partial area of the wrinkled resin layer 34 depending on the positions of the grooves on the surface of the exposing stage and that display unevenness depending on the area proportion of the gap to the reflection area is formed. In order to prevent the phenomenon, the glass substrate 10 may be subjected to exposure from the back surface side (i.e., the lower side in the figure) under predetermined exposing conditions after patterning the OC layer and before subjecting to the heat treatment at a temperature equal to or higher than the heat curing point. Consequently, the OC layer in the area corresponding to the gap between the light shielding portions 60a and 60b and the gate bus line 12 is substantially uniformly cured over all the pixels, whereby display unevenness is not viewed although no wrinkled unevenness is formed in that area through the subsequent heat treatment.

A Ti layer (or a Ti alloy layer) 17a having a thickness, for example, of 100 nm and an Al layer (or an Al alloy layer) 17b having a thickness, for example, of 100 nm are formed by sputtering on the whole surface of the wrinkled resin layer 34. A high melting point metal layer formed with Cr, Mo, Ta, W or alloys thereof may be formed instead of the Ti layer. A resist is then coated on the whole surface of the Al layer 17b and patterned by using a seventh photomask to form a resist pattern having a predetermined shape. Subsequently, dry etching using a chlorine series gas is effected by using the resist pattern as an etching mask. Consequently, a reflection electrode 17 is formed in the reflection area including the wrinkled resin layer 34. The surface of the reflection electrode 17 has a wrinkled uneven surface according to the surface of the wrinkled resin layer 34. The reflection electrode 17 is electrically connected to the source electrode 22 through the contact hole 26, and is electrically connected to the storage capacitor electrode 19 through a contact hole not shown in the figure. The reflection electrode 17 is also electrically connected to the transparent electrode 16 through a portion of the opening 27. Thereafter, the substrate is subjected to a heat treatment at a temperature of from 150 to 230° C., preferably 200° C. According to the aforementioned process steps, the TFT substrate 2 shown in FIG. 10 is completed.

According to this embodiment, in the step of patterning the positive light-sensitive resin layer for forming the wrinkled resin layer 34 in the reflection area, light reflected from the exposing stage is shielded by the light shielding portion 63 and the like, and thus the light is substantially not incident on the light-sensitive resin layer in the reflection area, as similar to the first to fourth embodiments. Therefore, a heat treatment by applying energy to the surface thereof in the subsequent step provides such a wrinkled resin layer 34 that has substantially uniform wrinkled unevenness formed thereon. Consequently, the reflection electrode 17 formed on the wrinkled resin layer 34 also has substantially uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics.

Furthermore, since the light shielding portion 63 is patterned by using the same photomask (the first photomask) as the transparent electrode 16, and the high melting point metal layer 53 on the transparent electrode 16 is removed by using the predetermined etchant after exposing through the opening 27 formed simultaneously with the contact hole 26. In this embodiment, therefore, the light shielding portion 63 is formed by using no additional photomask, and thus no process step is added to the manufacturing method of the TFT substrate 2.

Sixth Embodiment

A liquid crystal display substrate according to a sixth embodiment of the invention and a manufacturing method thereof will be described with reference to FIGS. 13 to 15B. FIG. 13 is a cross sectional view showing a constitution of a TFT substrate 2 according to this embodiment. In FIG. 13, the area having a TFT 20 of a pixel formed therein is shown on the left side, a transmission area of the pixel is shown at the center, and a reflection area of the adjacent pixel is shown on the right side, as similar to FIGS. 10 to 12B. As shown in FIG. 13, the TFT substrate 2 of this embodiment has the same constitution as the fifth embodiment except that it has a channel etching type TFT 25. That is, the TFT substrate 2 has a light shielding portion 63 formed by accumulating an ITO layer 52 formed with the same material as a transparent electrode 16 and a high melting point metal layer 53 having light shielding capability in this order, which are then patterned in the same shape.

A manufacturing method of the liquid crystal display substrate according to this embodiment will be described. FIGS. 14A to 15B are cross sectional views showing the manufacturing method of the TFT substrate 2 according to this embodiment. As shown in FIG. 14A, an ITO layer 52 having a thickness, for example, of 70 nm and a high melting point metal layer 53 having a thickness, for example, of 100 nm are formed by sputtering directly on a glass substrate 10 as a transparent insulating substrate or after forming a protective film, such as $SiO_x$, thereon depending on necessity. Consequently, an electroconductive film having a thickness of about 170 nm having the ITO layer 52 and the high melting point metal layer 53 accumulated is formed on the whole surface of the substrate. A resist is then coated on the whole surface of the electroconductive film and patterned by using a first photomask to form a resist pattern having a predetermined shape. Subsequently, wet etching by using, for example, a mixed reagent of acetic acid, nitric acid and phosphoric acid, and wet etching using, for example, a reagent, such as oxalic acid, are effected by using the resist pattern as an etching mask. Consequently, a light shielding portion 63 is formed on at least a portion of an area to be a reflection area, and an electroconductive film 54 is formed on an area to be a transmission area.

As shown in FIG. 14B, by the plasma process, an SiN film having a thickness, for example, of 200 nm is formed on the light shielding portion 63 and the electroconductive film 54 on the whole surface of the substrate to form an insulating film 31.

Figure 15A:
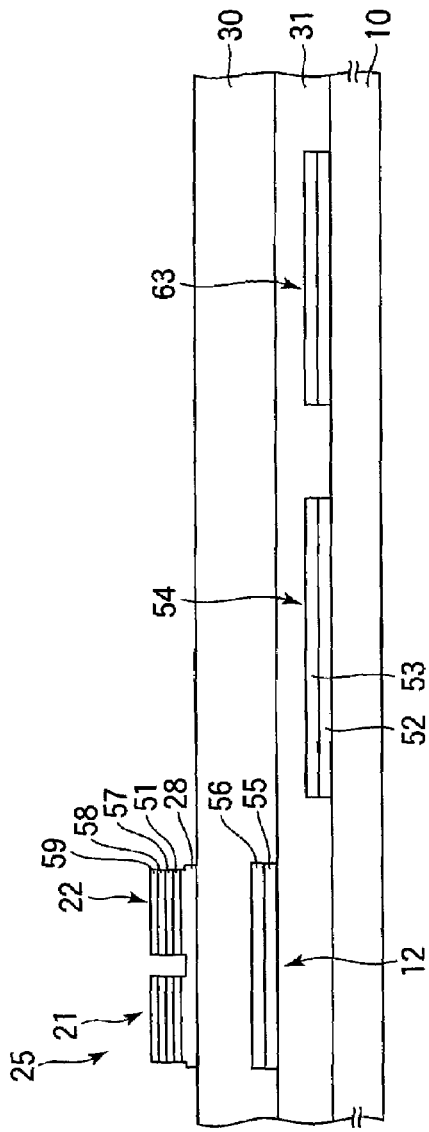
FIGS. 15A and 15B are cross sectional views showing a method of manufacturing a liquid crystal display substrate according to the sixth embodiment of the invention.

As shown in FIG. 15A, an Al layer (or an Al alloy layer) 55 having a thickness, for example, of 130 nm and a high melting point metal layer (such as a Ti layer or a Ti alloy layer) 56 having a thickness, for example, of 70 nm are formed in this order by sputtering on the insulating layer 31 on the whole surface of the substrate. Consequently, an electroconductive film having a thickness of 200 nm containing the Al layer 55 and the high melting point metal layer 56 accumulated is formed. A resist is then coated on the whole surface of the electroconductive film and patterned by using a second photomask to form a resist pattern having a predetermined shape. Subsequently, dry etching using, for example, a chlorine series gas is effected by using the resist pattern as an etching mask. Consequently, a gate bus line 12, a storage capacitor bus line 18 (not shown in the figure) and a gate bus line terminal (not shown in the figure) are formed.

An SiN film having a thickness, for example, of 400 nm is formed by the plasma CVD process on the gate bus line 12, the storage capacitor bus line 18 and the gate bus line terminal on the whole surface of the substrate, so as to form an insulating film (gate insulating film) 30. An a-Si layer having a thickness, for example, of 150 nm is then formed by the plasma CVD process on the whole surface of the insulating layer 30. Subsequently, an $n^+$a-Si layer having a thickness, for example, of 30 nm is formed by the plasma CVD process on the whole surface of the a-Si layer.

A resist is coated by spin coating on the whole surface of the $n^+$a-Si layer to form a resist layer. The glass substrate 10 is then exposed from the front surface side thereof by using a third photomask. The resist layer is then developed, and the resist layer in the exposed area is removed by dissolution. Consequently, a resist pattern is formed on the area for forming a TFT 25. Dry etching using a fluorine series gas is then effected by using the resist pattern as an etching mask. Consequently, an active semiconductor layer 28 and the $n^+$a-Si layer 51 as an upper layer thereof are formed in an island shape.

A high melting point metal layer (such as a Ti layer or a Ti alloy layer) 57 having a thickness, for example, of 40 nm, an Al layer (or an Al alloy layer) 58 having a thickness, for example, of 75 nm and a high melting point metal layer (such as a Ti layer or a Ti alloy layer) 59 having a thickness, for example, of 80 nm are formed by sputtering in this order to form an electroconductive film. Examples of the high melting point metal include Cr, Mo, Ta, W and alloys thereof. It is necessary that the high melting point metal layer 59 is not removed but remains upon removing by etching the high melting point metal layer 53 in the transmission area in the subsequent process step, and therefore, the materials for forming the high melting point metal layers 53 and 59 are selected under consideration of etching selectivity thereof (see FIG. 15B).

A resist is then coated on the whole surface of the electroconductive film and patterned by using a fourth photomask to form a resist pattern having a predetermined shape. The electroconductive film and the $n^+$a-Si layer 51 are subjected to dry etching using a chlorine series gas by using the resist pattern as an etching mask. In order to separate certainly the drain electrode 21 and the $n^+$a-Si layer 51 as an under layer thereof from the source electrode 22 and the $n^+$a-Si layer 51 as an under layer thereof, the etching is effected up to the surface of the active semiconductor layer 28 (channel etching). Consequently, the drain electrode 21 and the source electrode 22 of the TFT 25, a storage capacitor electrode 19 (not shown in the figure), a drain bus line 14 (not shown in the figure) and a drain bus line terminal (not shown in the figure) are formed. According to the aforementioned operations, a channel etching type TFT 25 is formed.

Figure 15B:
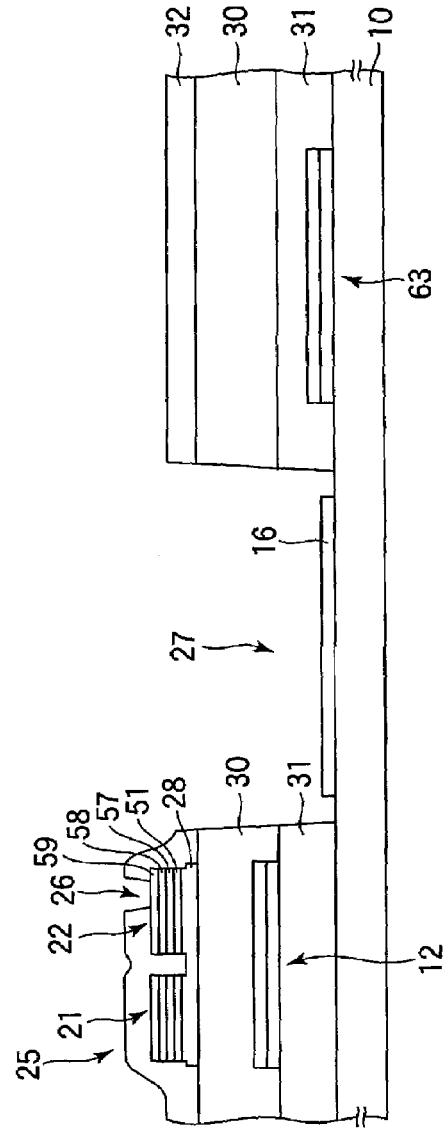

As shown in FIG. 15B, an SiN film having a thickness, for example, of 300 nm is formed by the plasma CVD process on the whole surface of the substrate to form a protective film 32. A resist is then coated on the whole surface of the protective film 32 and patterned by using a fifth photomask to form a resist pattern having a predetermined shape. The protective film 32 (and the insulating films 30 and 31) is subjected to dry etching using a mixed gas of a fluorine series gas and an $O_2$ gas by using the resist pattern as an etching mask. Consequently, a contact hole 26 on the source electrode 22, a contact hole (not shown in the figure) on the storage capacitor electrode 19 and a contact hole (not shown in the figure) on the gate bus line terminal and the drain bus line terminal are formed. Simultaneously, the protective film 32 and the insulating films 30 and 31 on the electroconductive film 54 in the transmission area are removed to form an opening 27. Subsequently, wet etching using a mixed reagent of acetic acid, nitric acid and phosphoric acid is effected. Consequently, the high melting point metal layer 53 as an upper layer of the electroconductive film 54 exposed through the opening 27 is removed, and the ITO layer 52 as a lower layer thereof remains, so as to form a transparent electrode 16.

A positive light-sensitive novolak resin, for example, is coated on the whole surface of the substrate by using a spin coater or a slit coater to form a light-sensitive resin layer having a thickness, for example, of about from 0.5 to 4 µm. Subsequently, the substrate is subjected to a heat treatment at a temperature of 160° C. or lower. The light-sensitive resin layer is then exposed by using a sixth photomask and is developed by using an alkali developer solution, such as TMAH, so as to form an OC layer having a predetermined shape. The OC layer is formed on at least a portion of the area to be the reflection area. In the exposing step for patterning, since the light shielding portion 63 is formed as an underlayer (i.e., on the side of the glass substrate 10) of the light-sensitive resin layer, light reflected on the exposing stage of the exposing apparatus is substantially not incident on the light-sensitive resin layer in the reflection area.

The OC layer is then annealed at a temperature of from 100 to 180° C. for from 0.2 to 60 minutes by using a clean oven or a hot plate. The surface of the OC layer is then irradiated with UV light having a wavelength of from 200 to 470 nm at an energy density of from 10 to 550 mJ/cm$^2$ for from 5 to 300 seconds. Subsequently, depending on necessity, the glass substrate 10 is exposed from the back surface side thereof. The OC layer is then annealed by using a clean oven or the like at a temperature of from 180 to 230° C. for about 1 hour. Consequently, a wrinkled resin layer 34 having wrinkled unevenness on the surface thereof is formed in the reflection area (see FIG. 13). As described in the foregoing, in this embodiment, light reflected by the exposing stage of the exposing apparatus is substantially not incident on the light-sensitive resin layer in the reflection area, and therefore, a wrinkled resin layer 34 having uniform wrinkled unevenness can be obtained through the subsequent UV light irradiation and heat treatment.

A Ti layer (or a Ti alloy layer) 17a having a thickness, for example, of 100 nm and an Al layer (or an Al alloy layer) 17b having a thickness, for example, of 100 nm are formed by sputtering on the whole surface of the wrinkled resin layer 34. A resist is then coated on the whole surface of the Al layer 17b and patterned by using a seventh photomask to form a resist pattern having a predetermined shape. Subsequently, dry etching using a chlorine series gas is effected by using the resist pattern as an etching mask. Consequently, a reflection electrode 17 is formed in the reflection area including the wrinkled resin layer 34. The surface of the reflection electrode 17 has a wrinkled uneven surface according to the surface of the wrinkled resin layer 34. The reflection electrode 17 is electrically connected to the source electrode 22 through the contact hole 26, and is electrically connected to the storage capacitor electrode 19 through a contact hole not shown in the figure. The reflection electrode 17 is also electrically connected to the transparent electrode 16 through a portion of the opening 27. Thereafter, the substrate is subjected to a heat treatment at a temperature of from 150 to 230° C., preferably 200° C. According to the aforementioned process steps, the TFT substrate 2 shown in FIG. 13 is completed.

According to this embodiment, in the step of patterning the positive light-sensitive resin layer for forming the wrinkled resin layer 34 in the reflection area, light reflected from the exposing stage is shielded by the light shielding portion 63 and the like, and thus the light is substantially not incident on the light-sensitive resin layer in the reflection area, as similar to the first to fifth embodiments. Therefore, a heat treatment by applying energy to the surface thereof in the subsequent step provides such a wrinkled resin layer 34 that has uniform wrinkled unevenness formed thereon. Consequently, the reflection electrode 17 formed on the wrinkled resin layer 34 also has substantially uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics.

Furthermore, since the light shielding portion 63 is patterned by using the same photomask (the first photomask) as the transparent electrode 16, and the high melting point metal layer 53 on the transparent electrode 16 is removed by using the predetermined etchant after exposing through the opening 27 formed simultaneously with the contact hole 26. In this embodiment, therefore, the light shielding portion 63 is formed by using no additional photomask, and thus no process step is added to the manufacturing method of the TFT substrate 2.

Seventh Embodiment

A liquid crystal display substrate according to a seventh embodiment of the invention and a manufacturing method thereof will be described with reference to FIGS. 16 to 17C. FIG. 16 is a cross sectional view showing a constitution of a TFT substrate 2 according to this embodiment. In FIG. 16, the area having a TFT 20 of a pixel formed therein is shown on the left side, a transmission area of the pixel is shown at the center, and a reflection area of the adjacent pixel is shown on the right side, as similar to FIGS. 10 to 15B. As shown in FIG. 16, the TFT substrate 2 of this embodiment has, in the transmission area, a transparent electrode 16 formed directly on the glass substrate 10. The surface of the transparent electrode 16 is exposed through an opening 27 where a protective film 32 and an insulating film 30 are removed. The transparent electrode 16 is electrically connected to the source electrode 22 of the TFT 20 through the reflection electrode 17. A gate bus line (gate electrode) 12 has such a constitution that an ITO layer 52 formed with the same material as the transparent electrode 16, a high melting point metal layer 70, an Al layer 71 and a high melting point metal layer 72 are accumulated in this order. A light shielding portion 64 is formed as an underlayer of the insulating film 30 in the reflection area. The light shielding portion 64 has such a constitution that an ITO layer 52 formed with the same material as the transparent electrode 16, a high melting point metal layer 70, an Al layer 71 and a high melting point metal layer 72 are accumulated in this order, as similar to the gate bus line 12. The layers constituting the light shielding portion 64 are patterned into the same shape.

A manufacturing method of the liquid crystal display substrate according to this embodiment will be described. FIGS. 17A to 17C are cross sectional views showing the manufacturing method of the TFT substrate 2 according to this embodiment. As shown in FIG. 17A, an ITO layer 52, a high melting point metal layer 70, an Al layer 71 and a high melting point metal layer 72 are formed in this order to form an electroconductive film directly on a glass substrate 10 or after forming a protective film, such as SiO$_x$, thereon depending on necessity. A resist is then coated on the whole surface of the electroconductive film and patterned by using a first photomask to form a resist pattern having a predetermined shape. Subsequently, wet etching by using, for example, a mixed reagent of acetic acid, nitric acid and phosphoric acid, and wet etching using, for example, a reagent, such as oxalic acid, are effected by using the resist pattern as an etching mask. Consequently, a gate bus line 12, a storage capacitor bus line 18 (not shown in the figure) and a gate bus line terminal (not shown in the figure) are formed, a light shielding portion 64 is formed on at least a portion of an area to be a reflection area, and an electroconductive film 54 is formed on an area to be a transmission area.

As shown in FIG. 17B, an SiN film is formed by the plasma CVD process on the gate bus line 12, the light shielding portion 64 and the electroconductive film 54 on the whole surface of the substrate to form an insulating film 30. An a-Si layer is then formed by the plasma CVD process on the while surface of the insulating layer 30. Subsequently, an SiN film is formed by the plasma CVD process on the whole surface of the a-Si layer. A resist is then coated by spin coating or the like on the whole surface of the SiN film to form a resist layer. The glass substrate 10 is then exposed from the back surface side thereof by using the gate bus line 12 as a mask. Subsequently, the glass substrate 10 is exposed from the front surface side thereof by using a second photomask. The resist layer is then developed, and the resist layer in the exposed area is removed by dissolution. Consequently, a resist pattern is formed in a self aligning manner only on the area for forming the channel protective film on the gate bus line 12. Dry etching using a fluorine series gas is then effected by using the resist pattern as an etching mask to form a channel protective film 23.

Immediately after cleaning the surface of the a-Si layer by using diluted hydrofluoric acid, an n$^+$a-Si layer is formed by the plasma CVD process on the whole surface of the substrate. A high melting point metal layer (such as a Ti layer or a Ti alloy layer) 57, an Al layer (or an Al alloy layer) 58 and a high melting point metal layer (such as a Ti layer or a Ti alloy layer) 59 are then formed by sputtering in this order to form an electroconductive film.

A resist is then coated on the whole surface of the electroconductive film and patterned by using a third photomask to form a resist pattern having a predetermined shape. The electroconductive film, the n$^+$a-Si layer and the a-Si layer are subjected to dry etching using a chlorine series gas by using the resist pattern as an etching mask. Consequently, a drain electrode 21 and a source electrode 22 of the TFT 20, an active semiconductor layer 28, a storage capacitor electrode 19 (not shown in the figure), a drain bus line 14 (not shown in the figure) and a drain bus line terminal (not shown in the figure) are formed. The channel protective film 23 functions as an etching stopper upon etching, and the a-Si layer as an underlayer thereof is not etched but remains. According to the aforementioned operations, a channel protective film type TFT 20 is formed.

As shown in FIG. 17C, an SiN film is formed by the plasma CVD process on the whole surface of the substrate to form a protective film 32. A resist is then coated on the whole surface of the protective film 32 and patterned by using a fourth photomask to form a resist pattern having a predetermined shape. The protective film 32 (and the insulating film 30) is subjected to dry etching using a mixed gas of a fluorine series gas and an O$_2$ gas by using the resist pattern as an etching mask. Consequently, a contact hole 26 on the source electrode 22, a contact hole (not shown in the figure) on the storage capacitor electrode 19 and a contact hole (not shown in the figure) on the gate bus line terminal and the drain bus line terminal are formed. Simultaneously, the protective film 32 and the insulating film 30 on the electroconductive film 54 in the transmission area are removed to form an opening 27.

A positive light-sensitive novolak resin, for example, is coated on the whole surface of the substrate by using a spin coater or a slit coater to form a light-sensitive resin layer having a thickness, for example, of about from 0.5 to 4 μm. Subsequently, the substrate is subjected to a heat treatment at a temperature of 160° C. or lower. The light-sensitive resin layer is then exposed by using a fifth photomask and is developed by using an alkali developer solution, such as TMAH, so as to form an OC layer having a predetermined shape. The OC layer is formed on at least a portion of the area to be the reflection area. In the exposing step for patterning, since the light shielding portion 64 is formed as an underlayer (i.e., on the side of the glass substrate 10) of the light-sensitive resin layer, light reflected on the exposing stage of the exposing apparatus is substantially not incident on the light-sensitive resin layer in the reflection area.

The OC layer is then annealed at a temperature of from 100 to 180° C. for from 0.2 to 60 minutes by using a clean oven or a hot plate. The surface of the OC layer is then irradiated with UV light having a wavelength of from 200 to 470 nm at an energy density of from 10 to 550 mJ/cm$^2$ for from 5 to 300 seconds. Subsequently, depending on necessity, the glass substrate 10 is exposed from the back surface side thereof. The OC layer is then annealed by using a clean oven or the like at a temperature of from 180 to 230° C. for about 1 hour. Consequently, a wrinkled resin layer 34 having wrinkled unevenness on the surface thereof is formed in the reflection area (see FIG. 16). As described in the foregoing, in this embodiment, light reflected by the exposing stage of the exposing apparatus is substantially not incident on the light-sensitive resin in the reflection area, and therefore, a wrinkled resin layer 34 having uniform wrinkled unevenness can be obtained through the subsequent UV light irradiation and heat treatment.

A Ti layer (or a Ti alloy layer) 17a and an Al layer (or an Al alloy layer) 17b are formed by sputtering on the whole surface of the wrinkled resin layer 34. A resist is then coated on the whole surface of the Al layer 17b and patterned by using a sixth photomask to form a resist pattern having a predetermined shape. Subsequently, dry etching using a chlorine series gas is effected by using the resist pattern as an etching mask. Consequently, a reflection electrode 17 is formed in the reflection area including the wrinkled resin layer 34. The surface of the reflection electrode 17 on the wrinkled resin layer 34 has a wrinkled uneven surface following the surface of the wrinkled resin layer 34. The reflection electrode 17 is electrically connected to the source electrode 22 through the contact hole 26, and is electrically connected to the storage capacitor electrode 19 through a contact hole not shown in the figure. The reflection electrode 17 is also electrically connected to the transparent electrode 16. By the etching operation, the high melting point metal layer 72, the Al layer 71 and the high melting point metal layer 70 of the electroconductive film 54 exposed through the opening 27 are removed, and the ITO layer 52 as the lowermost layer remains, so as to form a transparent electrode 16. Thereafter, the substrate is subjected to a heat treatment at a temperature of from 150 to 230° C., preferably 200° C. According to the aforementioned process steps, the TFT substrate 2 shown in FIG. 16 is completed.

According to this embodiment, in the step of patterning the positive light-sensitive resin layer for forming the wrinkled resin layer 34 in the reflection area, light reflected from the exposing stage is shielded by the light shielding portion 64 and the like, and thus the light is substantially not incident on the light-sensitive resin layer in the reflection area, as similar to the first to sixth embodiments. Therefore, a heat treatment by applying energy to the surface thereof in the subsequent step provides such a wrinkled resin layer 34 that has substantially uniform wrinkled unevenness formed thereon. Consequently, the reflection electrode 17 formed on the wrinkled resin layer 34 also has substantially uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics.

Furthermore, since the light shielding portion 64 is patterned by using the same photomask (the first photomask) as the transparent electrode 16, as similar to the fifth and sixth embodiments. The high melting point metal layer 70, the Al layer 71 and the high melting point metal layer 72 on the transparent electrode 16 are removed through the etching step for forming the reflection electrode 17 after exposing through the opening 27 formed simultaneously with the contact hole 26. In this embodiment, therefore, the light shielding portion 64 is formed by using no additional photomask, and thus no process step is added to the manufacturing method of the TFT substrate 2.

In this embodiment, furthermore, the transparent electrode 16 and the light shielding portion 64 are patterned by using the same photomask as the gate bus line 12 and the like. Therefore, the number of photomasks can be reduced by one in comparison to the fifth and sixth embodiments.

While this embodiment exemplifies the TFT substrate 2 having the channel protective film type TFT 20, the invention can also be applied to a TFT substrate 2 having a channel etching type TFT 25.

Eighth Embodiment

Figure 18:
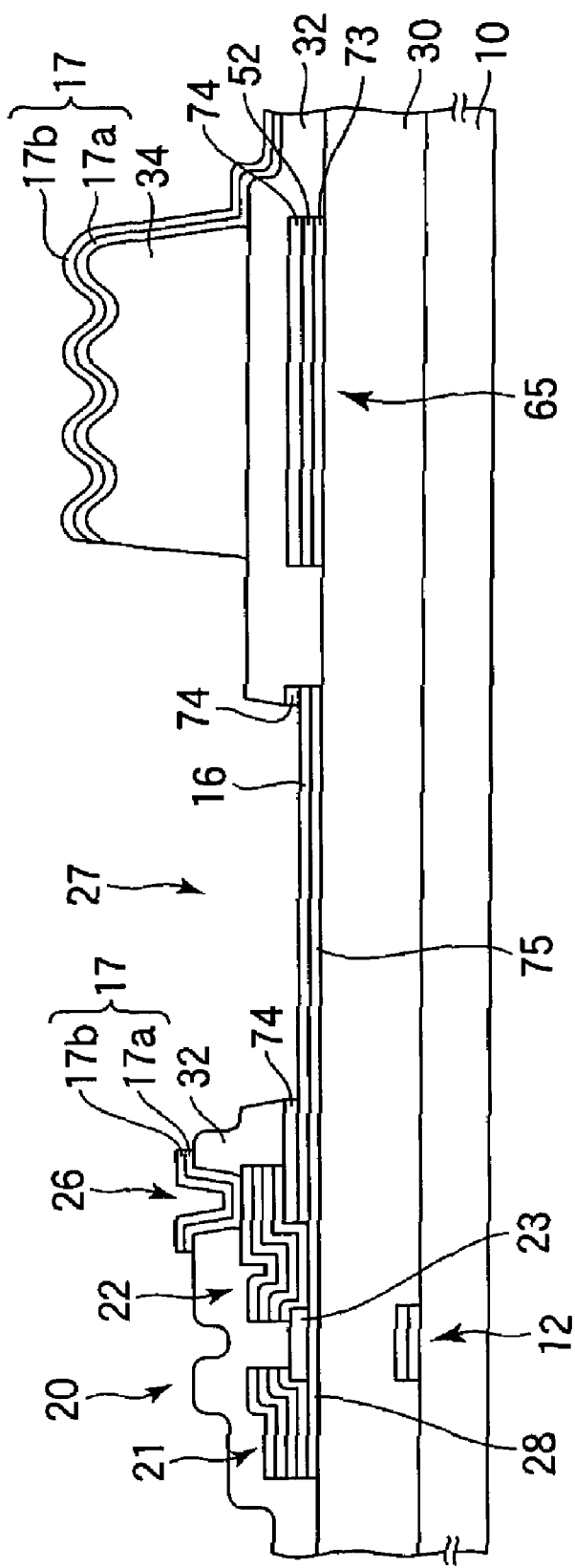
FIG. 18 is a cross sectional view showing a constitution of a liquid crystal display substrate according to an eighth embodiment of the invention.

A liquid crystal display substrate according to an eighth embodiment of the invention and a manufacturing method thereof will be described with reference to FIGS. 18 to 20B. FIG. 18 is a cross sectional view showing a constitution of a TFT substrate 2 according to this embodiment. In FIG. 18, the area having a TFT 20 of a pixel formed therein is shown on the left side, a transmission area of the pixel is shown at the center and a reflection area of the adjacent pixel is shown on the right side, as similar to FIGS. 10 to 17C. As shown in FIG. 18, the TFT substrate 2 of this embodiment has, on an insulating film 30 in the transmission area, an a-Si layer 75, which is formed with the same material with an active semiconductor layer 28 of the TFT 20 integrally therewith. A transparent electrode 16 is formed on the a-Si layer 75. In the reflection area, a light shielding portion 65 is formed on the insulating film 30 but as an underlayer of a protective film 32. The light shielding portion 65 has such a constitution that an a-Si layer 73 formed with the same material as the active semiconductor layer 28, an ITO layer 52 formed with the same material as the transparent electrode 16 and a high melting point metal layer 74 are accumulated in this order. The layers constituting the light shielding portion 65 are patterned into the same shape. In this embodiment, while the a-Si layer 75 is formed as an underlayer of the transparent electrode 16 in the transmission area, the thickness of the active semiconductor layer 28 of the channel protective film type TFT 20 and the thickness of the a-Si layer 75 are about from 30 to 50 nm, and thus the light transmittance in the transmission area is substantially not decreased.

A manufacturing method of the liquid crystal display substrate according to this embodiment will be described. FIGS. 19A to 20B are cross sectional views showing the manufacturing method of the TFT substrate 2 according to this embodiment. As shown in FIG. 19A, an Al layer (or an Al alloy layer) 55 and a high melting point metal layer (an Mo layer) 56 are formed in this order by sputtering directly on a glass substrate 10 or after forming a protective film, such as $SiO_x$, thereon depending on necessity. Consequently, an electroconductive film containing the Al layer 55 and the high melting point metal layer 56 is formed. Additional examples of the high melting point metal include Cr, Ti, Ta, W and alloys thereof. A resist is then coated on the whole surface of the electroconductive film and patterned by using a first photomask to form a resist pattern having a predetermined shape. Subsequently, dry etching using, for example a chlorine series gas is effected by using the resist pattern as an etching mask. Consequently, a gate bus line 12, a storage capacitor bus line 18 (not shown in the figure) and a gate bus line terminal (not shown in the figure) are formed.

As shown in FIG. 19B, an SiN film is formed by the plasma CVD process on the gate bus line 12, the storage capacitor bus line 18 and the gate bus line terminal on the whole surface of the substrate to form an insulating film 30. An a-Si layer 76 is then formed by the plasma CVD process on the while surface of the insulating layer 30. Subsequently, an SiN film is formed by the plasma CVD process on the whole surface of the a-Si layer 76. A resist is then coated by spin coating or the like on the whole surface of the SiN film to form a resist layer. The glass substrate 10 is then exposed from the back surface side thereof by using the gate bus line 12 as a mask. Subsequently, the glass substrate 10 is exposed from the front surface side thereof by using a second photomask. The resist layer is then developed, and the resist layer in the exposed area is removed by dissolution. Consequently, a resist pattern is formed in a self aligning manner only on the area for forming the channel protective film on the gate bus line 12. Dry etching using a fluorine series gas is then effected by using the resist pattern as an etching mask to form a channel protective film 23.

An ITO layer 52 and a high melting point metal layer 74 are formed in this order by sputtering on the whole surface of the channel protective film 23. Consequently, an electroconductive film having the ITO layer 52 and the high melting point metal layer 74 accumulated is formed on the whole surface of the substrate. A resist is then coated on the whole surface of the electroconductive film and patterned by using a third photomask to form a resist pattern having a predetermined shape. Subsequently, wet etching by using, for example, a mixed reagent of acetic acid, nitric acid and phosphoric acid, and wet etching using, for example, a reagent, such as oxalic acid, are effected by using the resist pattern as an etching mask. Consequently, a light shielding portion 65' is formed on at least a portion of an area to be a reflection area, and an electroconductive film 54 is formed in the transmission area.

As shown in FIG. 20A, immediately after cleaning the surface of the a-Si layer 76 by using diluted hydrofluoric acid, an $n^+$a-Si layer is formed by the plasma CVD process on the whole surface of the substrate. A high melting point metal layer (such as a Ti layer or a Ti alloy layer) 57, an Al layer (or an Al alloy layer) 58 and a high melting point metal layer 59 are then formed by sputtering in this order to form an electroconductive film.

A resist is then coated on the whole surface of the electroconductive film and patterned by using a fourth photomask to form a resist pattern having a predetermined shape. The electroconductive film, the $n^+$a-Si layer and the a-Si layer 76 are subjected to dry etching using a chlorine series gas by using the resist pattern as an etching mask.

Consequently, a drain electrode 21 and a source electrode 22 of the TFT 20, an active semiconductor layer 28, a storage capacitor electrode 19 (not shown in the figure), a drain bus line 14 (not shown in the figure), a drain bus line terminal (not shown in the figure) and an a-Si layer 75 are formed. The channel protective film 23 functions as an etching stopper upon etching, and the a-Si layer 76 as an underlayer thereof is not etched but remains. The source electrode 22 is electrically connected to an ITO layer 52 in the transmission area to be a transparent electrode 16 through the high melting point metal layer 74. According to the aforementioned operations, a channel protective film type TFT 20 is formed, and simultaneously a light shielding portion 65 having the a-Si layer 73, the ITO layer 52 and the high melting point metal layer 74 accumulated is formed.

As shown in FIG. 20B, an SiN film is formed by the plasma CVD process on the whole surface of the substrate to form a protective film 32. A resist is then coated on the whole surface of the protective film 32 and patterned by using a fifth photomask to form a resist pattern having a predetermined shape. The protective film 32 (and the insulating film 30) is subjected to dry etching using a mixed gas of a fluorine series gas and an $O_2$ gas by using the resist pattern as an etching mask. Consequently, a contact hole 26 on the source electrode 22, a contact hole (not shown in the figure) on the storage capacitor electrode 19 and a contact hole (not shown in the figure) on the gate bus line terminal and the drain bus line terminal are formed. Simultaneously, the protective film 32 on the electroconductive film 54 in the transmission area is removed to form an opening 27.

A positive light-sensitive novolak resin, for example, is coated on the whole surface of the substrate by using a spin coater or a slit coater to form a light-sensitive resin layer having a thickness, for example, of about from 0.5 to 4 μm. Subsequently, the substrate is subjected to a heat treatment at a temperature of 160° C. or lower. The light-sensitive resin layer is then exposed by using a sixth photomask and is developed by using an alkali developer solution, such as TMAH, so as to form an OC layer having a predetermined shape. The OC layer is formed on at least a portion of the area to be the reflection area. In the exposing step for patterning, since the light shielding portion 65 is formed as an underlayer (i.e., on the side of the glass substrate 10) of the light-sensitive resin layer, light reflected on the exposing stage of the exposing apparatus is substantially not incident on the light-sensitive resin layer in the reflection area.

The OC layer is then annealed at a temperature of from 100 to 180° C. for from 0.2 to 60 minutes by using a clean oven or a hot plate. The surface of the OC layer is then irradiated with UV light having a wavelength of from 200 to 470 nm at an energy density of from 10 to 550 mJ/cm$^2$ for from 5 to 300 seconds. Subsequently, depending on necessity, the glass substrate 10 is exposed from the back surface side thereof. The OC layer is then annealed by using a clean oven or the like at a temperature of from 180 to 230° C. for about 1 hour. Consequently, a wrinkled resin layer 34 having wrinkled unevenness on the surface thereof is formed in the reflection area (see FIG. 18). As described in the foregoing, in this embodiment, light reflected by the exposing stage of the exposing apparatus is substantially not incident on the light-sensitive resin layer in the reflection area, and therefore, a wrinkled resin layer 34 having uniform wrinkled unevenness can be obtained through the subsequent UV light irradiation and heat treatment.

A Ti layer (or a Ti alloy layer) 17a and an Al layer (or an Al alloy layer) 17b are formed by sputtering on the whole surface of the wrinkled resin layer 34. A resist is then coated on the whole surface of the Al layer 17b and patterned by using a seventh photomask to form a resist pattern having a predetermined shape. Subsequently, dry etching using a chlorine series gas is effected by using the resist pattern as an etching mask. Consequently, a reflection electrode 17 is formed in the reflection area including the wrinkled resin layer 34. The surface of the reflection electrode 17 on the wrinkled resin layer 34 has a wrinkled uneven surface following the surface of the wrinkled resin layer 34. The reflection electrode 17 is electrically connected to the source electrode 22 through the contact hole 26, and is electrically connected to the storage capacitor electrode 19 through a contact hole not shown in the figure. By the etching operation, the high melting point metal layer 74 as an upper layer of the electroconductive film 54 exposed through the opening 27 is removed, and the ITO layer 52 as a lower layer remains, so as to form a transparent electrode 16. Thereafter, the substrate is subjected to a heat treatment at a temperature of from 150 to 230° C., preferably 200° C. According to the aforementioned process steps, the TFT substrate 2 shown in FIG. 18 is completed.

According to this embodiment, in the step of patterning the positive light-sensitive resin layer for forming the wrinkled resin layer 34 in the reflection area, light reflected from the exposing stage is shielded by the light shielding portion 65 and the like, and thus the light is substantially not incident on the light-sensitive resin layer in the reflection area, as similar to the first to seventh embodiments. Therefore, a heat treatment by applying energy to the surface thereof in the subsequent step provides such a wrinkled resin layer 34 that has substantially uniform wrinkled unevenness formed thereon. Consequently, the reflection electrode 17 formed on the wrinkled resin layer 34 also has substantially uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics.

Furthermore, since the light shielding portion 65 is patterned by using the same photomask (the third photomask) as the transparent electrode 16, as similar to the fifth to seventh embodiments. The high melting point metal layer 74 on the transparent electrode 16 is removed through the etching step for forming the reflection electrode 17 after exposing through the opening 27 formed simultaneously with the contact hole 26. In this embodiment, therefore, the light shielding portion 65 is formed by using no additional photomask, and thus no process step is added to the manufacturing method of the TFT substrate 2.

Ninth Embodiment

A liquid crystal display substrate according to a ninth embodiment of the invention and a manufacturing method thereof will be described with reference to FIGS. 21 to 23B. FIG. 21 is a cross sectional view showing a constitution of a TFT substrate 2 according to this embodiment. In FIG. 21, the area having a TFT 20 of a pixel formed therein is shown on the left side, a transmission area of the pixel is shown at the center, and a reflection area of the adjacent pixel is shown on the right side, as similar to FIGS. 10 to 20B. As shown in FIG. 21, the TFT substrate 2 of this embodiment has, on an insulating film 30 in the transmission area, an a-Si layer 75, which is formed with the same material with an active semiconductor layer 28 of the TFT 20 integrally therewith. An SiN film 77 formed with the same material as a channel protective film 23 of the TFT 20 is formed on the a-Si layer 75. A transparent electrode 16 is formed on the SiN film 77. In the reflection area, a light shielding portion 66 is formed on the insulating film 30 but as an underlayer of a protective film 32. The light shielding portion 66 has such a constitution that an a-Si layer 73 formed with the same material as the active semiconductor layer 28, an SiN filml 77 formed with the same material as the channel protective film 23, an ITO layer 52 formed with the same material as the transparent electrode 16 and a high melting point metal layer 74 are accumulated in this order. The layers constituting the light shielding portion 66 are patterned into the same shape. In this embodiment, while the a-Si layer 75 and the SiN film 77 are formed as underlayers of the transparent electrode 16 in the transmission area, the thickness of the active semiconductor layer 28 of the channel protective film type TFT 20 and the thickness of the a-Si layer 75 are about from 30 to 50 nm, and SiN film 77 has good light transmission, and thus the light transmittance in the transmission area is substantially not decreased.

Figure 22A:
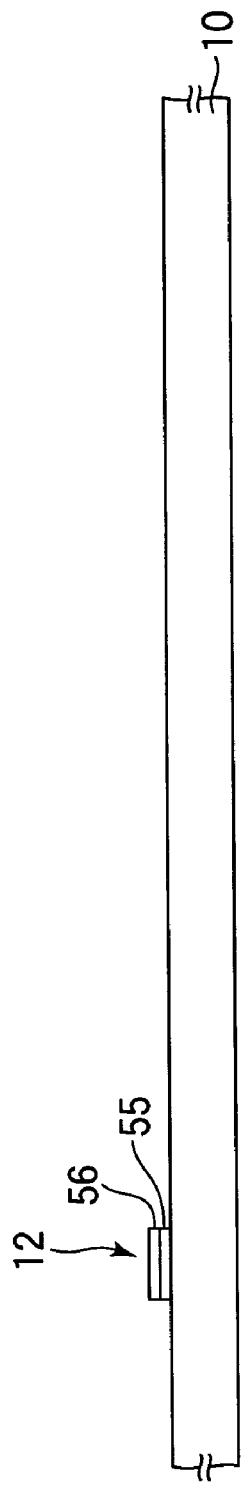
FIGS. 22A and 22B are cross sectional views showing a method of manufacturing a liquid crystal display substrate according to the ninth embodiment of the invention.

A manufacturing method of the liquid crystal display substrate according to this embodiment will be described. FIGS. 22A to 23B are cross sectional views showing the manufacturing method of the TFT substrate 2 according to this embodiment. As shown in FIG. 22A, an Al layer (or an Al alloy layer) 55 and a high melting point metal layer (an Mo layer) 56 are formed in this order by sputtering directly on a glass substrate 10 or after forming a protective film, such as $SiO_x$, thereon depending on necessity. Consequently, an electroconductive film containing the Al layer 55 and the high melting point metal layer 56 is formed. Additional examples of the high melting point metal include Cr, Ti, Ta, W and alloys thereof. A resist is then coated on the whole surface of the electroconductive film and patterned by using a first photomask to form a resist pattern having a predetermined shape. Subsequently, dry etching using, for example a chlorine series gas is effected by using the resist pattern as an etching mask. Consequently, a gate bus line 12, a storage capacitor bus line 18 (not shown in the figure) and a gate bus line terminal (not shown in the figure) are formed.

Figure 22B:
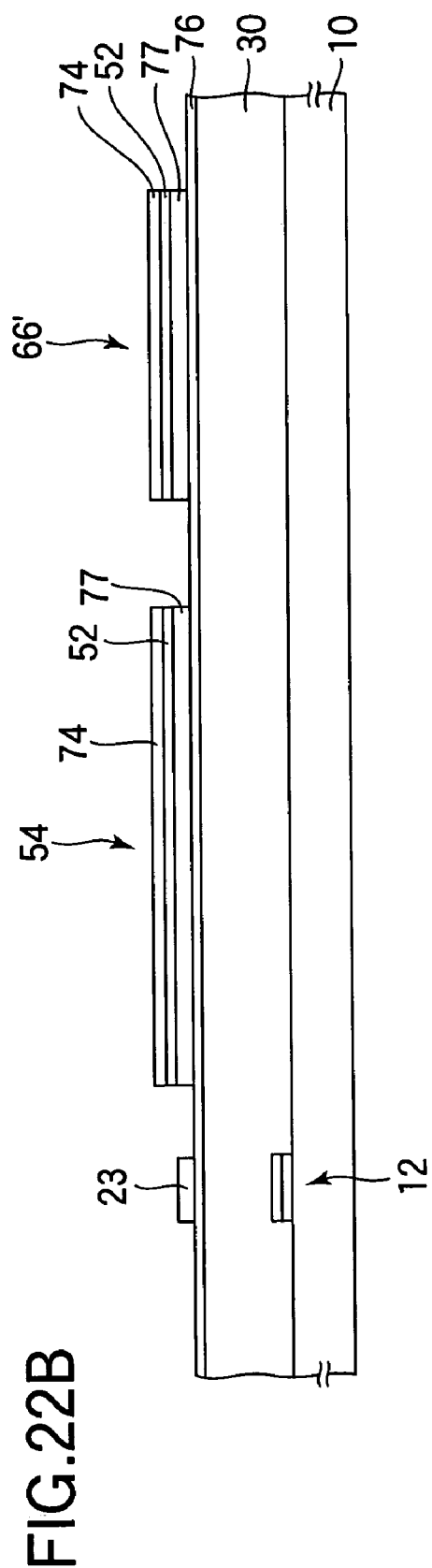

As shown in FIG. 22B, an SiN film is formed by the plasma CVD process on the gate bus line 12, the storage capacitor bus line 18 and the gate bus line terminal on the whole surface of the substrate to form an insulating film 30. An a-Si layer 76 is then formed by the plasma CVD process on the while surface of the insulating layer 30. Subsequently, an SiN film is formed by the plasma CVD process on the whole surface of the a-Si layer 76. An ITO layer 52 and a high melting point metal layer 74 are formed by sputtering on the whole surface of the SiN film. A resist is then coated on the whole surface of the high melting point metal layer 74 and patterned by using a second photomask to form a resist pattern having a predetermined shape. Subsequently, by using the resist pattern as an etching mask, the high melting point metal layer 74 and the ITO layer 52 are subjected to wet etching by using, for example, a mixed reagent of acetic acid, nitric acid and phosphoric acid, and wet etching using, for example, a reagent, such as oxalic acid. Consequently, an electroconductive film 54 is formed in the transmission area, and an electroconductive film to be an upper layer of a light shielding portion 66' is formed on at least a portion of the reflection area.

A resist is then coated on the whole surface of the substrate. The glass substrate 10 is exposed from the back surface side thereof by using the gate bus line 12 as a mask. Subsequently, the glass substrate 10 is exposed from the front surface side by using a third photomask. The resist layer is then developed, and the resist layer in the exposed area is removed by dissolution. Consequently, a resist pattern is formed in a self aligning manner only on the area for forming the channel protective film on the gate bus line 12. The SiN film is then subjected to dry etching using a fluorine series gas by using the resist pattern, the electroconductive film 54 in the transmission area and the electroconductive film in the reflection area as an etching mask. Consequently, a channel protective film 23, an SiN film 77 as an underlayer of the electroconductive film 54, and an SiN film 77 as an underlayer of the light shielding portion 66' are formed.

Figure 23A:
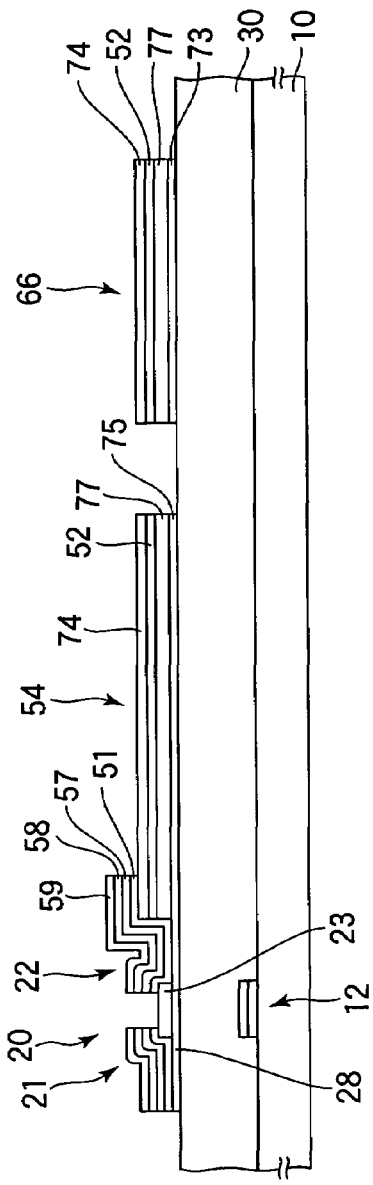
FIGS. 23A and 23B are cross sectional views showing a method of manufacturing a liquid crystal display substrate according to the ninth embodiment of the invention.

As shown in FIG. 23A, immediately after cleaning the surface of the a-Si layer 76 by using diluted hydrofluoric acid, an $n^+$a-Si layer is formed by the plasma CVD process on the whole surface of the substrate. A high melting point metal layer (such as a Ti layer or a Ti alloy layer) 57, an Al layer (or an Al alloy layer) 58 and a high melting point metal layer 59 are formed by sputtering in this order to form an electroconductive film.

A resist is then coated on the whole surface of the electroconductive film and patterned by using a fourth photomask to form a resist pattern having a predetermined shape. The electroconductive film, the $n^+$a-Si layer and the a-Si layer 76 are subjected to dry etching using a chlorine series gas by using the resist pattern as an etching mask. Consequently, a drain electrode 21 and a source electrode 22 of the TFT 20, an active semiconductor layer 28, a storage capacitor electrode 19 (not shown in the figure), a drain bus line 14 (not shown in the figure), a drain bus line terminal (not shown in the figure) and a-Si layers 73 and 75 are formed. The source electrode 22 is electrically connected to the ITO layer 52 in the transmission area to be a transparent electrode 16 through the high melting point metal layer 74. According to the aforementioned operations, a channel protective film type TFT 20 is formed, and simultaneously a light shielding portion 66 having the a-Si layer 73, the SiN film 77, the ITO layer 52 and the high melting point metal layer 74 accumulated is formed.

Figure 23B:
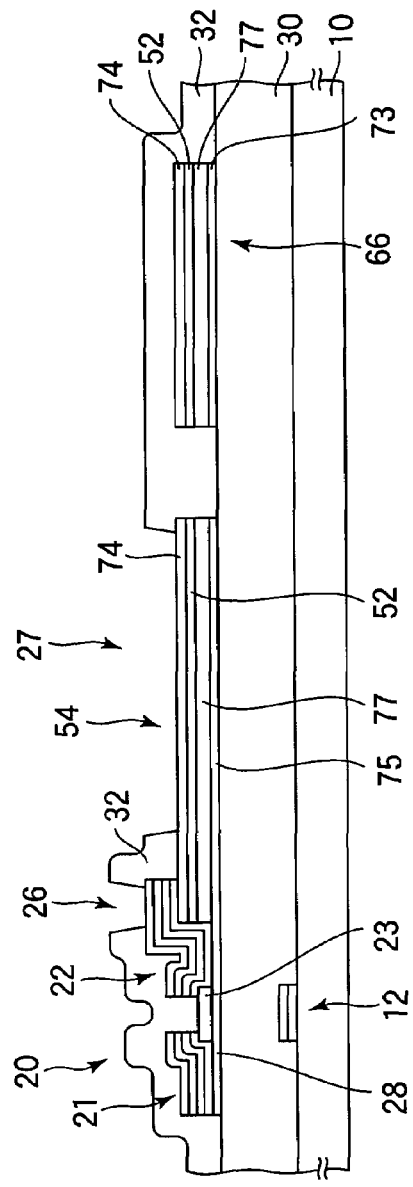

As shown in FIG. 23B, an SiN film is formed by the plasma CVD process on the whole surface of the substrate to form a protective film 32. A resist is then coated on the whole surface of the protective film 32 and patterned by using a fifth photomask to form a resist pattern having a predetermined shape. The protective film 32 (and the insulating film 30) is subjected to dry etching using a mixed gas of a fluorine series gas and an $O_2$ gas by using the resist pattern as an etching mask. Consequently, a contact hole 26 on the source electrode 22, a contact hole (not shown in the figure) on the storage capacitor electrode 19 and a contact hole (not shown in the figure) on the gate bus line terminal and the drain bus line terminal are formed. Simultaneously, the protective film 32 on the electroconductive film 54 in the transmission area is removed to form an opening 27.

A positive light-sensitive novolak resin, for example, is coated on the whole surface of the substrate by using a spin coater or a slit coater to form a light-sensitive resin layer having a thickness, for example, of about from 0.5 to 4 µm. Subsequently, the substrate is subjected to a heat treatment at a temperature of 160° C. or lower. The light-sensitive resin layer is then exposed by using a sixth photomask and is developed by using an alkali developer solution, such as TMAH, so as to form an OC layer having a predetermined shape. The OC layer is formed on at least a portion of the area to be the reflection area. In the exposing step for patterning, since the light shielding portion 66 is formed as an underlayer (i.e., on the side of the glass substrate 10) of the light-sensitive resin layer, light reflected on the exposing stage of the exposing apparatus is substantially not incident on the light-sensitive resin layer in the reflection area.

The OC layer is then annealed at a temperature of from 100 to 180° C. for from 0.2 to 60 minutes by using a clean oven or a hot plate. The surface of the OC layer is then irradiated with UV light having a wavelength of from 200 to 470 nm at an energy density of from 10 to 550 mJ/cm² for from 5 to 300 seconds. Subsequently, depending on necessity, the glass substrate 10 is exposed from the back surface side thereof. The OC layer is then annealed by using a clean oven or the like at a temperature of from 180 to 230° C. for about 1 hour. Consequently, a wrinkled resin layer 34 having wrinkled unevenness on the surface thereof is formed in the reflection area (see FIG. 21). As described in the foregoing, in this embodiment, light reflected by the exposing stage of the exposing apparatus is substantially not incident on the light-sensitive resin layer in the reflection area, and therefore, a wrinkled resin layer 34 having uniform wrinkled unevenness can be obtained through the subsequent UV light irradiation and heat treatment.

A Ti layer (or a Ti alloy layer) 17a and an Al layer (or an Al alloy layer) 17b are formed by sputtering on the whole surface of the wrinkled resin layer 34. A resist is then coated on the whole surface of the Al layer 17b and patterned by using a seventh photomask to form a resist pattern having a predetermined shape. Subsequently, dry etching using a chlorine series gas is effected by using the resist pattern as an etching mask. Consequently, a reflection electrode 17 is formed in the reflection area including the wrinkled resin layer 34. The surface of the reflection electrode 17 on the wrinkled resin layer 34 has a wrinkled uneven surface following the surface of the wrinkled resin layer 34. The reflection electrode 17 is electrically connected to the source electrode 22 through the contact hole 26, and is electrically connected to the storage capacitor electrode 19 through a contact hole not shown in the figure. By the etching operation, the high melting point metal layer 74 as an upper layer of the electroconductive film 54 exposed through the opening 27 is removed, and the ITO layer 52 as a lower layer remains, so as to form a transparent electrode 16. Thereafter, the substrate is subjected to a heat treatment at a temperature of from 150 to 230° C., preferably 200° C. According to the aforementioned process steps, the TFT substrate 2 shown in FIG. 21 is completed.

According to this embodiment, in the step of patterning the positive light-sensitive resin layer for forming the wrinkled resin layer 34 in the reflection area, light reflected from the exposing stage is shielded by the light shielding portion 66 and the like, and thus the light is substantially not incident on the light-sensitive resin layer in the reflection area, as similar to the first to eighth embodiments. Therefore, a heat treatment by applying energy to the surface thereof in the subsequent step provides such a wrinkled resin layer 34 that has substantially uniform wrinkled unevenness formed thereon. Consequently, the reflection electrode 17 formed on the wrinkled resin layer 34 also has substantially uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics.

Furthermore, since the light shielding portion 66 is patterned by using the same photomask (the second photomask) as the transparent electrode 16, as similar to the fifth to eighth embodiments. The high melting point metal layer 74 on the transparent electrode 16 is removed through the etching step for forming the reflection electrode 17 after exposing through the opening 27 formed simultaneously with the contact hole 26. In this embodiment, therefore, the light shielding portion 66 is formed by using no additional photomask, and thus no process step is added to the manufacturing method of the TFT substrate 2.

Tenth Embodiment

Figure 24:
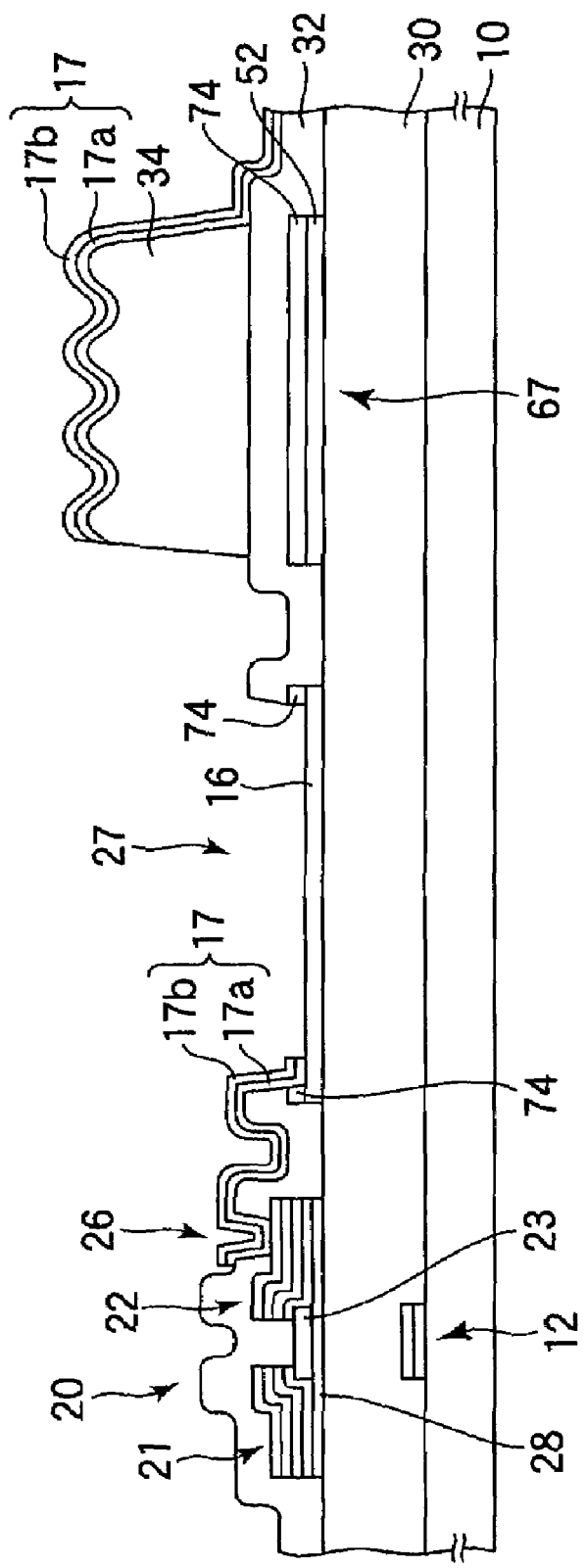
FIG. 24 is a cross sectional view showing a constitution of a liquid crystal display substrate according to a tenth embodiment of the invention.

A liquid crystal display substrate according to a tenth embodiment of the invention and a manufacturing method thereof will be described with reference to FIGS. 24 to 26B. FIG. 24 is a cross sectional view showing a constitution of a TFT substrate 2 according to this embodiment. In FIG. 24, the area having a TFT 20 of a pixel formed therein is shown on the left side, a transmission area of the pixel is shown at the center, and a reflection area of the adjacent pixel is shown on the right side, as similar to FIGS. 10 to 23B. As shown in FIG. 24, the TFT substrate 2 of this embodiment has a transparent electrode 16 on an insulating film 30 in the transmission area. In the reflection area, a light shielding portion 67 is formed on the insulating film 30 but as an under layer of a protective film 32. The light shielding portion 67 has such a constitution that an ITO layer 52 formed with the same material as the transparent electrode 16 and a high melting point metal layer 74 are accumulated in this order. The layers constituting the light shielding portion 67 are patterned into the same shape.

Figure 25A:
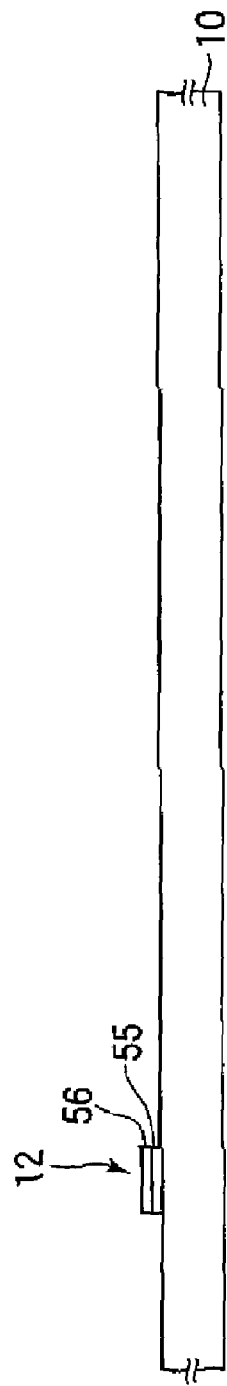
FIGS. 25A and 25B are cross sectional views showing a method of manufacturing a liquid crystal display substrate according to the tenth embodiment of the invention.

A manufacturing method of the liquid crystal display substrate according to this embodiment will be described. FIGS. 25A to 26B are cross sectional views showing the manufacturing method of the TFT substrate 2 according to this embodiment. As shown in FIG. 25A, an Al layer (or an Al alloy layer) 55 and a high melting point metal layer (an Mo layer) 56 are formed in this order by sputtering directly on a glass substrate 10 or after forming a protective film, such as SiO$_x$, thereon depending on necessity. Consequently, an electroconductive film containing the Al layer 55 and the high melting point metal layer 56 is formed. A resist is then coated on the whole surface of the electroconductive film and patterned by using a first photomask to form a resist pattern having a predetermined shape. Subsequently, dry etching using, for example a chlorine series gas is effected by using the resist pattern as an etching mask. Consequently, a gate bus line 12, a storage capacitor bus line 18 (not shown in the figure) and a gate bus line terminal (not shown in the figure) are formed.

Figure 25B:
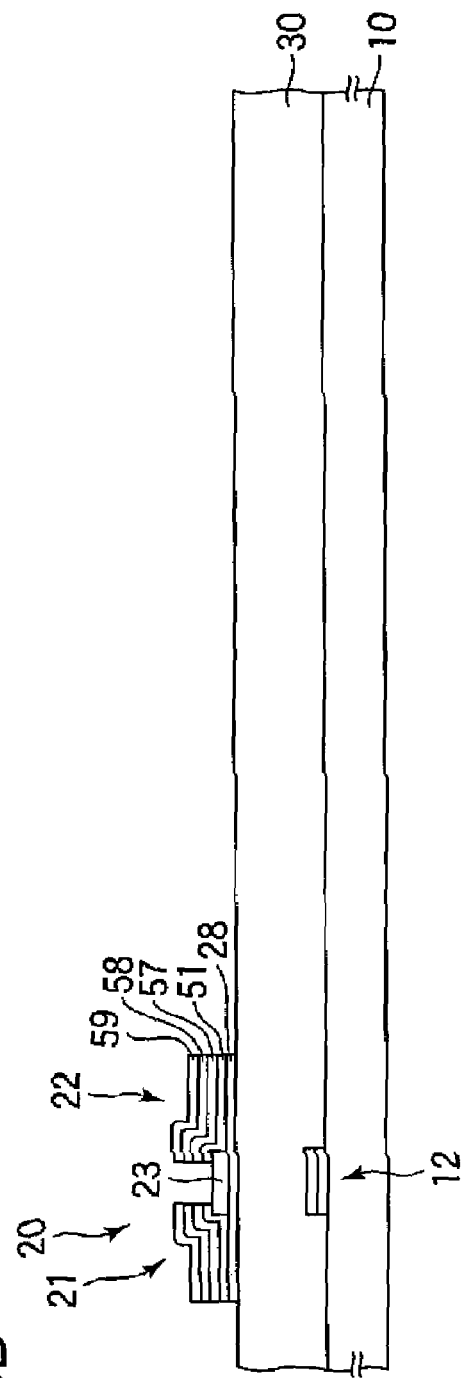
Figure 27A:
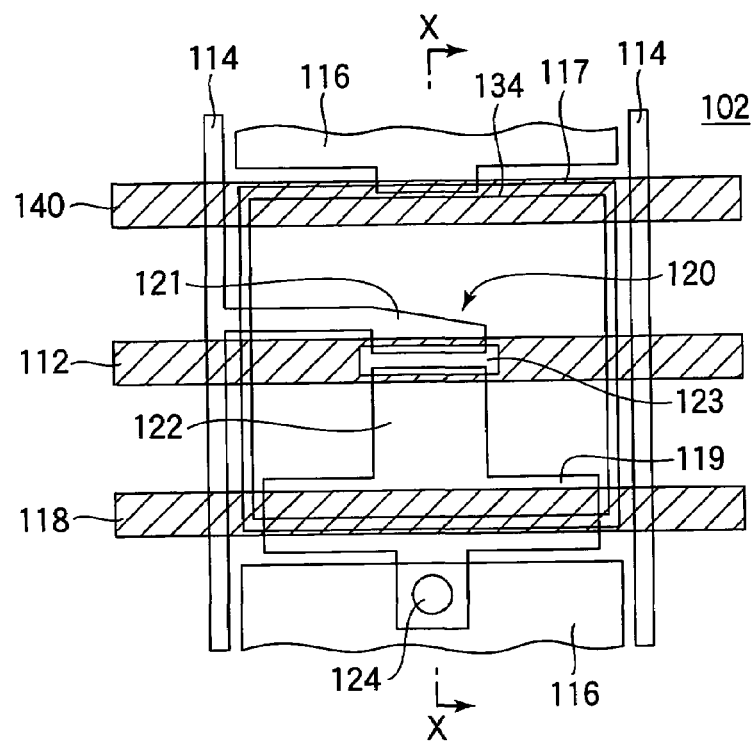
FIGS. 27A and 27B are a plan view and a cross sectional view showing a constitution of a TFT substrate of a conventional transreflective liquid crystal display device.
Figure 27B:
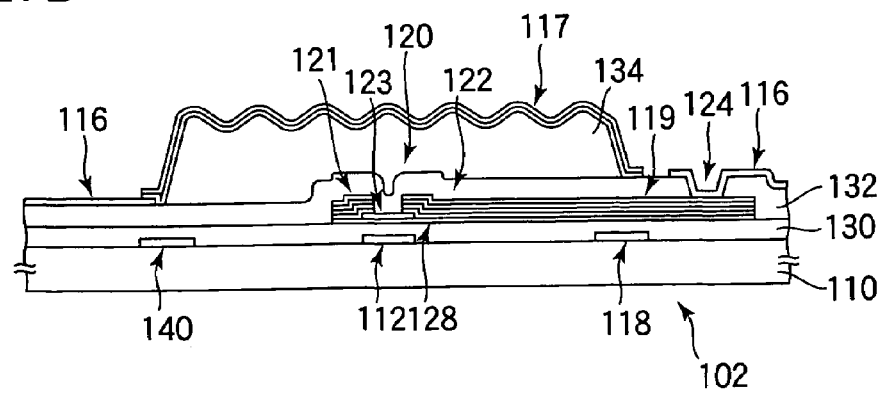

As shown in FIG. 25B, an SiN film is formed by the plasma CVD process on the gate bus line 12, the storage capacitor bus line 18 and the gate bus line terminal on the whole surface of the substrate to form an insulating film 30. An a-Si layer is then formed by the plasma CVD process on the while surface of the insulating layer 30. Subsequently, an SiN film is formed by the plasma CVD process on the whole surface of the a-Si layer. A resist is then coated by spin coating or the like on the whole surface of the SiN film to form a resist layer. The glass substrate 10 is then exposed from the back surface side thereof by using the gate bus line 12 as a mask. Subsequently, the glass substrate 10 is exposed from the front surface side thereof by using a second photomask. The resist layer is then developed, and the resist layer in the exposed area is removed by dissolution. Consequently, a resist pattern is formed in a self aligning manner only on the area for forming the channel protective film on the gate bus line 12. Dry etching using a fluorine series gas is then effected by using the resist pattern as an etching mask to form a channel protective film 23.

Immediately after cleaning the surface of the a-Si layer by using diluted hydrofluoric acid, an n+a-Si layer is formed by the plasma CVD process on the whole surface of the substrate. A high melting point metal layer (such as a Ti layer or a Ti alloy layer) 57, an Al layer (or an Al alloy layer) 58 and a high melting point metal layer 59 are then formed by sputtering in this order to form an electroconductive film.

A resist is then coated on the whole surface of the electroconductive film and patterned by using a third photomask to form a resist pattern having a predetermined shape. The electroconductive film, the n+a-Si layer and the a-Si layer are subjected to dry etching using a chlorine series gas by using the resist pattern as an etching mask. Consequently, a drain electrode 21 and a source electrode 22 of the TFT 20, an active semiconductor layer 28, a storage capacitor electrode 19 (not shown in the figure), a drain bus line 14 (not shown in the figure) and a drain bus line terminal (not shown in the figure) are formed. According to the aforementioned operations, a channel protective film type TFT 20 is formed.

As shown in FIG. 26A, an ITO layer 52 and a high melting point metal layer 74 are formed by sputtering on the drain electrode 21 and the source electrode 22 on the whole surface of the substrate. A resist is then coated on the whole surface of the high melting point metal layer 74 and patterned by using a fourth photomask to form a resist pattern having a predetermined shape. Subsequently, by using the resist pattern as an etching mask, the high melting point metal layer 74 and the ITO layer 52 are subjected to wet etching by using, for example, a mixed reagent of acetic acid, nitric acid and phosphoric acid, and wet etching using, for example, a reagent, such as oxalic acid. Consequently, an electroconductive film 54 is formed in the transmission area, and a light shielding portion 67 is formed on at least a portion of the reflection area.

As shown in FIG. 26B, an SiN film is formed by the plasma CVD process on the whole surface of the substrate to form a protective film 32. A resist is coated on the whole surface of the protective film 32 and patterned by using a fifth photomask to form a resist pattern having a predetermined shape. The protective film 32 (and the insulating film 30) is subjected to dry etching using a mixed gas of a fluorine series gas and an $O_2$ gas by using the resist pattern as an etching mask. Consequently, a contact hole 26 on the source electrode 22, a contact hole (not shown in the figure) on the storage capacitor electrode 19 and a contact hole (not shown in the figure) on the gate bus line terminal and the drain bus line terminal are formed. Simultaneously, the protective film 32 on the electroconductive film 54 in the transmission area is removed to form an opening 27.

A positive light-sensitive novolak resin, for example, is coated on the whole surface of the substrate by using a spin coater or a slit coater to form a light-sensitive resin layer having a thickness, for example, of about from 0.5 to 4 μm. Subsequently, the substrate is subjected to a heat treatment at a temperature of 160° C. or lower. The light-sensitive resin layer is then exposed by using a sixth photomask and is developed by using an alkali developer solution, such as TMAH, so as to form an OC layer having a predetermined shape. The OC layer is formed on at least a portion of the area to be the reflection area. In the exposing step for patterning, since the light shielding portion 67 is formed as an underlayer (i.e., on the side of the glass substrate 10) of the light-sensitive resin layer, light reflected on the exposing stage of the exposing apparatus is substantially not incident on the light-sensitive resin layer in the reflection area.

The OC layer is then annealed at a temperature of from 100 to 180° C. for from 0.2 to 60 minutes by using a clean oven or a hot plate. The surface of the OC layer is then irradiated with UV light having a wavelength of from 200 to 470 nm at an energy density of from 10 to 550 mJ/cm² for from 5 to 300 seconds. Subsequently, depending on necessity, the glass substrate 10 is exposed from the back surface side thereof. The OC layer is then annealed by using a clean oven or the like at a temperature of from 180 to 230° C. for about 1 hour. Consequently, a wrinkled resin layer 34 having wrinkled unevenness on the surface thereof is formed in the reflection area (see FIG. 24). As described in the foregoing, in this embodiment, light reflected by the exposing stage of the exposing apparatus is substantially not incident on the light-sensitive resin in the reflection area, and therefore, a wrinkled resin layer 34 having uniform wrinkled unevenness can be obtained through the subsequent UV light irradiation and heat treatment.

A Ti layer (or a Ti alloy layer) 17a and an Al layer (or an Al alloy layer) 17b are formed by sputtering on the whole surface of the wrinkled resin layer 34. A resist is then coated on the whole surface of the Al layer 17b and patterned by using a seventh photomask to form a resist pattern having a predetermined shape. Subsequently, dry etching using a chlorine series gas is effected by using the resist pattern as an etching mask. Consequently, a reflection electrode 17 is formed in the reflection area including the wrinkled resin layer 34. The surface of the reflection electrode 17 on the wrinkled resin layer 34 has a wrinkled uneven surface following the surface of the wrinkled resin layer 34. The reflection electrode 17 is electrically connected to the source electrode 22 through the contact hole 26, and is electrically connected to the storage capacitor electrode 19 through a contact hole not shown in the figure. The reflection electrode 17 is also electrically connected to the transparent electrode 16 through a portion of the opening 27. By the etching operation, the high melting point metal layer 74 as an upper layer of the electroconductive film 54 exposed through the opening 27 is removed, and the ITO layer 52 as a lower layer remains, so as to form the transparent electrode 16. Thereafter, the substrate is subjected to a heat treatment at a temperature of from 150 to 230° C., preferably 200° C. According to the aforementioned process steps, the TFT substrate 2 shown in FIG. 24 is completed.

According to this embodiment, in the step of patterning the positive light-sensitive resin layer for forming the wrinkled resin layer 34 in the reflection area, light reflected from the exposing stage is shielded by the light shielding portion 67 and the like, and thus the light is substantially not incident on the light-sensitive resin layer in the reflection area, as similar to the first to ninth embodiments. Therefore, a heat treatment by applying energy to the surface thereof in the subsequent step provides such a wrinkled resin layer 34 that has substantially uniform wrinkled unevenness formed thereon. Consequently, the reflection electrode 17 formed on the wrinkled resin layer 34 also has substantially uniform wrinkled unevenness to obtain a desired inclined plane distribution with good controllability. According to this embodiment, therefore, excellent reflection uniformity and stable reflectivity can be obtained to realize a transreflective liquid crystal display device having good reflection display characteristics.

Furthermore, since the light shielding portion 67 is patterned by using the same photomask (the fourth photomask) as the transparent electrode 16, as similar to the fifth to ninth embodiments. The high melting point metal layer 74 on the transparent electrode 16 is removed through the etching step for forming the reflection electrode 17 after exposing through the opening 27 formed simultaneously with the contact hole 26. In this embodiment, therefore, the light shielding portion 67 is formed by using no additional photomask, and thus no process step is added to the manufacturing method of the TFT substrate 2.

The invention encompasses various modifications in addition to the aforementioned embodiments.

For example, while a transreflective liquid crystal display device is exemplified in the aforementioned embodiments, the invention is not limited thereto and can be applied to a reflection liquid crystal display device.

What is claimed is:

1. A liquid crystal display substrate comprising:
    a plurality of pixel areas each having at least a portion thereof a reflection area reflecting light incident from a front surface side of the substrate;
    a wrinkled resin layer formed with a positive light-sensitive resin in the reflection area, the wrinkled resin layer having at least a portion thereof a wrinkled surface;
    a reflection electrode formed with a light reflection material on the wrinkled resin layer, the reflection electrode having a wrinkled surface following the surface of the wrinkled resin layer; and
    a light shielding portion formed as an underlayer of the wrinkled resin layer, the light shielding portion shielding light incident from a back surface side of the substrate,
    wherein the plurality of pixel areas each has a transmission area having a transparent electrode formed therein that transmits light incident from the back surface side of the substrate to the front surface side of the substrate; and
    at least a portion of the light shielding portion is formed with the same material as the transparent electrode.

2. A liquid crystal display substrate as claimed in claim 1, wherein the light shielding portion comprises an underlayer formed with the same material as the transparent electrode, and an upper layer formed with a material having light shielding capability on the underlayer and patterned in substantially the same shape as the underlayer.

3. A liquid crystal display device comprising a pair of substrates facing each other and a liquid crystal sealed between the pair of substrates,
    one of the pair of substrates comprises a liquid crystal display substrate as claimed in claim 1.

* * * * *